US011271894B1

(12) United States Patent
McCarty et al.

(10) Patent No.: US 11,271,894 B1
(45) Date of Patent: Mar. 8, 2022

(54) SYSTEMS, DEVICES, AND METHODS FOR PRIVATE QUERY AND EXCHANGE OF DOMAIN INFORMATION

(71) Applicant: Accenture Global Solutions Limited, Dublin (IE)

(72) Inventors: Benjamin Glen McCarty, Washington, DC (US); Amin Hassanzadeh, Arlington, VA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/198,093

(22) Filed: Mar. 10, 2021

(51) Int. Cl.
| | |
|---|---|
| *H04L 29/12* | (2006.01) |
| *H04L 61/4511* | (2022.01) |
| *H04L 9/08* | (2006.01) |
| *H04L 9/14* | (2006.01) |
| *H04L 61/4552* | (2022.01) |

(52) U.S. Cl.
CPC ........ *H04L 61/1511* (2013.01); *H04L 9/0825* (2013.01); *H04L 9/14* (2013.01); *H04L 61/1552* (2013.01)

(58) Field of Classification Search
CPC ..... H04L 61/1511; H04L 9/0825; H04L 9/14; H04L 61/1552
See application file for complete search history.

(56) References Cited

U.S. PATENT DOCUMENTS

| | | | | |
|---|---|---|---|---|
| 7,079,499 | B1 * | 7/2006 | Akhtar | H04L 63/08 370/310 |
| 8,165,304 | B2 * | 4/2012 | Choi | H04L 9/3297 380/277 |
| 9,894,041 | B2 * | 2/2018 | Norum | H04L 63/0428 |
| 10,009,169 | B2 * | 6/2018 | Murray | H04L 9/14 |
| RE47,019 | E  * | 8/2018 | Thornewell | H04L 63/126 |
| 11,128,597 | B1 * | 9/2021 | Johnson | H04L 67/02 |

(Continued)

OTHER PUBLICATIONS

Siby, Sandra, et al. "Encrypted DNS→ Privacy? A traffic analysis perspective." arXiv preprint arXiv: 1906.09682 (2019).*

(Continued)

*Primary Examiner* — Jimmy H Tran
(74) *Attorney, Agent, or Firm* — Norton Rose Fulbright US LLP

(57) ABSTRACT

Aspects of the present disclosure provide systems, methods, apparatus, and computer-readable storage media that support private querying and exchanging of domain information, such as Domain Name System (DNS) information, between multiple devices. To illustrate, two devices may generate and exchange a list domain information queries and a list of domain information items, respectively. The lists may be encrypted by respective private keys of the devices. Each device may double-encrypt the respective received list using the respective private key, reorder the double-encrypted list, and transmit the reordered double-encrypted list to the other device. The reordered double-encrypted list of domain information items may be compared to the double-encrypted list of domain information queries to identify indices of domain information queries that match domain information items while maintaining privacy of the domain information queries and domain information items at the devices.

20 Claims, 10 Drawing Sheets

(56) References Cited

U.S. PATENT DOCUMENTS

| | | | | |
|---|---|---|---|---|
| 2006/0155871 | A1* | 7/2006 | Ilkka | H04W 8/26 709/238 |
| 2009/0257597 | A1* | 10/2009 | Bromley | H04L 9/083 380/282 |
| 2010/0310076 | A1* | 12/2010 | Barzilai | G06F 21/10 380/278 |
| 2011/0038483 | A1* | 2/2011 | Goeller | H04L 63/0807 380/282 |
| 2012/0155646 | A1* | 6/2012 | Seshadri | H04L 61/1511 380/279 |
| 2016/0323110 | A1* | 11/2016 | Campagna | H04L 9/0897 |
| 2016/0373252 | A1* | 12/2016 | Goldstein | H04L 63/123 |
| 2017/0093802 | A1* | 3/2017 | Norum | H04L 61/1511 |
| 2017/0264590 | A1* | 9/2017 | Xing | H04L 63/1466 |
| 2017/0279617 | A1* | 9/2017 | Blinn | H04L 9/3247 |
| 2018/0278571 | A1* | 9/2018 | Gal | H04L 61/1511 |
| 2020/0021446 | A1* | 1/2020 | Roennow | H04L 63/0478 |
| 2020/0195677 | A1* | 6/2020 | Uppal | H04L 61/6004 |
| 2021/0021588 | A1* | 1/2021 | McPherson | H04L 61/1511 |

OTHER PUBLICATIONS

Wang, Liang, et al. "Programmable in-network obfuscation of DNS traffic." NDSS: DNS Privacy Workshop. 2021.*

Lu, Chaoyi, et al. "An end-to-end, large-scale measurement of dns-over-encryption: How far have we come?." Proceedings of the Internet Measurement Conference. 2019.*

Bushart, Jonas, and Christian Rossow. "Padding Ain't Enough: Assessing the Privacy Guarantees of Encrypted {DNS}." 10th { USENIX} Workshop on Free and Open Communications on the Internet ({FOCI} 20). 2020.*

Yan, Zhiwei, and Jong-Hyouk Lee. "The road to DNS privacy." Future Generation Computer Systems 112 (2020): 604-611.*

Schmitt, Paul, Anne Edmundson, and Nick Feamster. "Oblivious DNS: Practical privacy for DNS queries." arXiv preprint arXiv: 1806.00276 (2018).*

Zhu, Liang, et al. "Connection-oriented DNS to improve privacy and security." 2015 IEEE symposium on security and privacy. IEEE, 2015.*

\* cited by examiner

SYSTEMS, DEVICES, AND METHODS FOR PRIVATE QUERY AND EXCHANGE OF DOMAIN INFORMATION

TECHNICAL FIELD

The present disclosure relates generally to systems and methods for enabling private querying and exchanging of domain information, such as Domain Name System (DNS) information, between multiple network devices.

BACKGROUND

Technology advancements have resulted in increased use of the Internet in the average person's daily life. For example, the Internet may be used to exchange messages, e-mails, music, video content, and social media content between people in diverse geographic locations. A backbone of the Internet is the Domain Name System ("DNS"), a hierarchical and decentralized naming system for computers, services, or other resources connected to the Internet or a private network. To access content hosted on the Internet, many computers or other electronic devices perform DNS resolutions. A DNS resolution refers to the process for translating a domain name, such as www.example.com, into an Internet protocol (IP) address that is accessible to a computer or other electronic device. For example, DNS resolutions may be triggered by anything that uses a domain name, such as sending an email, visiting a website, using an internet application, or sending a network command to a domain name. These DNS resolutions may be used to identify address records of Internet and network resources in order to enable the computer or other electronic device to connect to them. While DNS resolutions are designed to be efficient, transparent, and easy to use, DNS resolutions are not designed to be secure or private.

DNS resolutions may occur between a client and a DNS registry (or other device, such as a DNS ROOT or a centralized zone data service (CZDS)). When the client (e.g., a computer or other electronic device) performs a DNS query for a particular domain name with the registry, the registry responds with one of three typical types of response code: a response code that indicates the DNS query is successfully completed (i.e., "[0]NOERROR"); a response code that indicates there is an error or DNS failure with the DNS query (i.e., "[1]FORMERROR", "[2]SERVFAIL", or "[5]REFUSED"); or a response code that indicates that the domain name does not exist (e.g., no one else has been allocated the domain name) (i.e., "[3]NXDOMAIN", also referred to as "NXD"). Because of the DNS resolutions are designed to be transparent, a DNS resolution may include both a queried domain name and the associated response code, which indicates whether the query resulted in an existing domain name or that the domain name does not exist.

Issues may arise from the lack of security provided by DNS resolutions. As a particular example, a client may want to purchase the rights to a particular domain name. In such an example, the client may perform a DNS query for the particular domain name with a registry responsible for registering and allocating domain names. If the DNS query for the particular domain name returns a NXDOMAIN response, the client is made aware that the particular domain name is available. However, some intervening parties may attempt to take advantage of the lack of security associated with DNS resolutions to harm the client. For example, an intervening device operated by a malicious actor may intercept the DNS query and the response code before the response code reaches the client. Because the DNS query and the response code are not private, the malicious actor can see the NXDOMAIN response code and the particular domain name, which may enable the malicious actor to purchase the client's requested domain name before the client can make the purchase. The malicious actor is then able to take advantage of the client by either buying and holding the desired domain name or buying and attempting to sell the desired domain name to the client at a high price. Additionally, if the registry knows the client's desired domain name, the registry can increase the price of the client's desired domain name.

Another potential issue caused by the lack of security and privacy associated with the DNS resolution process is that a client may be exposed to a man-in-the middle attack. For example, NXDOMAIN responses can be intercepted by an intervening device and replaced with poisoned or hijacked DNS responses in order to attack, censor, or track the client on the Internet. Another potential issue is that a client may be subject to extortion due to the lack of privacy and security within the DNS resolution process. For example, DNS queries and DNS responses may be intercepted to generate logs of what DNS queries and responses have been communicated, when the DNS queries and responses have been communicated, and to which individuals or organizations the DNS queries and responses have been communicated. These logs can be used to reveal private information about the client that has made the DNS query or received a DNS response, which can be used for extortion or coercion. To address these security issues, the client may encrypt a DNS query. However, in order for the registry to process the encrypted DNS query, the registry must have access to an encryption key used to encrypt the DNS query. Communicating the encryption key is associated with risks that the encryption key may be intercepted by an unintended party. Additionally, such encryption does not prevent the registry from performing undesired actions, such as increasing the price of a client's desired domain address.

SUMMARY

Aspects of the present disclosure provide systems, methods, apparatus, and computer-readable storage media that support private querying and exchanging of domain information between multiple devices. For example, techniques of the present disclosure may maintain privacy and confidentiality of queries for or exchanges of domain information, such as Domain Name System (DNS) information, unlike conventional DNS queries and resolutions. To illustrate, lists of multiple domain information queries and multiple domain information items may be encrypted by corresponding devices, using respective private keys, and exchanged. The devices may encrypt the received list using their respective private key to double-encrypt the received list, and the devices may reorder the double-encrypted lists before transmitting the reordered double-encrypted list back to the other device. Each device may compare the double-encrypted list that it generated to the double-encrypted list received from the other device to determine if any elements of the double-encrypted lists match, which indicates the number of matches between the list of domain information queries and the list of domain information items. Because each device does not have access to the private key of the other device, neither device is able to fully decrypt the lists provided by the other device. Thus, a device is able to query another device for domain information, such as DNS information, in a private and confidential manner without triggering a non-existent domain (NXDOMAIN) response or other non-secure response.

To illustrate, a first network device may encrypt a list of domain information queries (e.g., DNS name queries) using a first private key and transmit the encrypted list of domain information queries to a second network device. The second network device may encrypt a list of domain information items (e.g., DNS names maintained by the second network device) using a second private key and transmit the encrypted list of domain information items to the first network device. Each of the network devices may double-encrypt (e.g., encrypt using their respective private key) and reorder the encrypted list received from the other network device. For example, the first network device may encrypt the encrypted list of domain information items using the first private key and reorder the double-encrypted list of domain information items, such as by performing a random shuffle. After the reordering, the network devices may exchange the reordered lists. For example, the first network device may transmit the reordered double-encrypted list of domain information items to the second network device.

After receiving the reordered double-encrypted list, the second network device may use the reordered double encrypted list to determine whether any of the domain information queries match the domain information items, and if so, which queries have matches. To illustrate, the second network device may compare the double-encrypted list of domain information queries generated at the second network device to the reordered double-encrypted list of domain information items received from the first network device. If any elements of the double-encrypted list of domain information queries match a respective element of the reordered double-encrypted list of domain information items, the second network device identifies the indices of the elements of the double-encrypted list of domain information queries, and the second network device transmits the indices to the first network device. The first network device identifies the domain information queries associated with the indices as successful queries based on information maintained by the second network device, and the first network device may initiate one or more operations based on the identified queries, or based on queries that are not associated with a match. As a non-limiting example, if the second network device corresponds to a registry or other domain service, the first network device may initiate a purchase of domain names corresponding to unsuccessful queries. These unsuccessful queries may be indicated without transmission of NXDOMAIN response that could be intercepted by malicious actors. Although described as being used for domain names, additional information, such as domain name record types and domain name record values may be privately queried and exchanged in this manner.

The present disclosure describes systems, methods, apparatus, and computer-readable media that provide benefits compared to conventional DNS information exchange systems. For example, the present disclosure supports private and confidential querying and exchanging of domain information, as compared to conventional DNS queries and resolutions. To illustrate, because the network devices encrypt their respective lists with their private keys, which are not accessible to the other network device, and because the network devices reorder lists received from other devices, the exchanged information (e.g., the list of domain information queries or the list of domain information items) is not able to be decrypted at the other devices. Instead, each device is able to determine how many (if any) matches occur, and the indices corresponding to the other device's list, without being able to read the list from the other device or determine which elements of their respective list match. Thus, the queries are kept private and confidential from the device being queried, which may prevent the registry entity being queried from increasing prices related to Internet domain names that the querying entity is interested in purchasing. Additionally, the registry entity is able to indicate to the querying entity which domain information is available without providing the querying entity with a list of all available domain information in the registry. In addition to preserving the privacy and confidentiality between the querying entity and the registry entity, the techniques of the present disclosure may prevent attacks that intercept the queries or the domain information (e.g., "Man-in-the-Middle" attacks), such as spoofing, poisoning, or hijacking the intercepted domain information to attack, censor, or track the querying entity and the registry entity on the Internet.

In a particular aspect, a method for private querying for domain information between multiple devices includes encrypting, by one or more processors, a list of a plurality of domain information queries based on a first private key to generate an encrypted list of the plurality of domain information queries. The method also includes initiating, by the one or more processors, transmission to a network device of the encrypted list of the plurality of domain information queries. The method includes receiving, by the one or more processors and from the network device, a first encrypted list of a plurality of domain information items. The method also includes encrypting, by the one or more processors, the first encrypted list of the plurality of domain information items based on the first private key to generate a second encrypted list of the plurality of domain information items. The method includes reordering, by the one or more processors, the second encrypted list of the plurality of domain information items to generate a reordered encrypted list of the plurality of domain information items. The method also includes initiating, by the one or more processors, transmission to the network device of the reordered encrypted list of the plurality of domain information items. The method includes receiving, by the one or more processors from the network device, one or more indices. The method further includes identifying, by the one or more processors, a first set of one or more domain information queries from the list of the plurality of domain information queries that correspond to the one or more indices.

In another particular aspect, a device for private querying for domain information between multiple devices includes a memory and one or more processors communicatively coupled to the memory. The one or more processors are configured to encrypt a list of a plurality of domain information queries based on a first private key to generate an encrypted list of the plurality of domain information queries. The one or more processors are also configured to initiate transmission of the encrypted list of the plurality of domain information queries to a network device. The one or more processors are configured to receive, from a network device, a first encrypted list of a plurality of domain information items. The one or more processors are also configured to encrypt the first encrypted list of the plurality of domain information items based on the first private key to generate a second encrypted list of the plurality of domain information items. The one or more processors are configured to reorder the second encrypted list of the plurality of domain information items to generate a reordered encrypted list of the plurality of domain information items. The one or more processors are also configured to initiate transmission to the network device of the reordered encrypted list of the plurality of domain information items. The one or more processors are configured to receive, from the network device, one or more indices. The one or more processors are further configured to identify a first set of one or more domain information queries from the list of the plurality of domain information queries that correspond to the one or more indices.

In another particular aspect, a non-transitory computer-readable storage medium stores instructions that, when executed by one or more processors, cause the one or more processors to perform operations for private querying for domain information between multiple devices. The operations include encrypting a list of a plurality of domain information queries based on a first private key to generate an encrypted list of the plurality of domain information queries. The operations also include initiating transmission of the encrypted list of the plurality of domain information queries to a network device. The operations include receiving, from a network device, a first encrypted list of a plurality of domain information items. The operations also include encrypting the first encrypted list of the plurality of domain information items based on the first private key to generate a second encrypted list of the plurality of domain information items. The operations include reordering the second encrypted list of the plurality of domain information items to generate a reordered encrypted list of the plurality of domain information items. The operations also include initiating transmission to the network device of the reordered encrypted list of the plurality of domain information items. The operations include receiving, from the network device, one or more indices. The operations further include identifying a first set of one or more domain information queries from the list of the plurality of domain information queries that correspond to the one or more indices.

In a particular aspect, a method for private exchanging of domain information between multiple devices includes encrypting, by one or more processors, a list of a plurality of domain information items based on a first private key to generate a first encrypted list of the plurality of domain information items. The method also includes initiating, by the one or more processors, transmission to a network device of the first encrypted list of the plurality of domain information items. The method includes receiving, by the one or more processors from the network device, a first encrypted list of a plurality of domain information queries. The method also includes encrypting, by the one or more processors, the first encrypted list of the plurality of domain information queries based on the first private key to generate a second encrypted list of the plurality of domain information queries. The method includes reordering, by the one or more processors, the second encrypted list of the plurality of domain information queries to generate a reordered encrypted list of the plurality of domain information queries. The method also includes receiving, by the one or more processors from the network device, a reordered encrypted list of the plurality of domain information items. The method further includes initiating, by the one or more processors, transmission to the network device of one or more indices based on a determination that the one or more indices correspond to one or more elements of the second encrypted list of the plurality of domain information queries that match one or more elements of the reordered encrypted list of the plurality of domain information items.

In another particular aspect, a device for private exchanging of domain information between multiple devices includes a memory and one or more processors communicatively coupled to the memory. The one or more processors are configured to encrypt a list of a plurality of domain information items based on a first private key to generate a first encrypted list of the plurality of domain information items. The one or more processors are also configured to initiate transmission to a network device of the first encrypted list of the plurality of domain information items. The one or more processors are configured to receive, from the network device, a first encrypted list of a plurality of domain information queries. The one or more processors are also configured to encrypt the first encrypted list of the plurality of domain information queries based on the first private key to generate a second encrypted list of the plurality of domain information queries. The one or more processors are configured to reorder the second encrypted list of the plurality of domain information queries to generate a reordered encrypted list of the plurality of domain information queries. The one or more processors are also configured to receive, from the network device, a reordered encrypted list of the plurality of domain information items. The one or more processors are further configured to initiate transmission to the network device of one or more indices based on a determination that the one or more indices correspond to one or more elements of the second encrypted list of the plurality of domain information queries that match one or more elements of the reordered encrypted list of the plurality of domain information items.

In another particular aspect, a non-transitory computer-readable storage medium stores instructions that, when executed by one or more processors, cause the one or more processors to perform operations for private exchanging of domain information between multiple devices. The operations include encrypting a list of a plurality of domain information items based on a first private key to generate a first encrypted list of the plurality of domain information items. The operations also include initiating transmission to a network device of the first encrypted list of the plurality of domain information items. The operations include receiving, from the network device, a first encrypted list of a plurality of domain information queries. The operations also include encrypting the first encrypted list of the plurality of domain information queries based on the first private key to generate a second encrypted list of the plurality of domain information queries. The operations include reordering the second encrypted list of the plurality of domain information queries to generate a reordered encrypted list of the plurality of domain information queries. The operations also include receiving, from the network device, a reordered encrypted list of the plurality of domain information items. The operations further include initiating transmission to the network device of one or more indices based on a determination that the one or more indices correspond to one or more elements of the second encrypted list of the plurality of domain information queries that match one or more elements of the reordered encrypted list of the plurality of domain information items.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support private querying and exchanging of domain information, such as Domain Name System (DNS) information, between multiple devices. Network devices, such as client devices, registry servers, centralized zone data services (CZDSs), devices acting as a DNS ROOT, or the like, may be configured to encrypt and exchange domain information queries and domain information items (e.g., domain names, domain name record types, domain name record values, and the like) for double-encryption and reordering by other devices. The reordered double-encrypted lists may then be exchanged and used to identify the number, and indices, of domain information queries from a first device that match domain information items maintained by a second device. As a non-limiting example, a client device may query a registry server to determine if the registry server maintains domain information items (e.g., Internet domain names) that match multiple domain information queries, and if any of the queries do not match one of the domain information items, the client device may initiate purchase operations for the corresponding Internet domain names. Because the queries are kept private (e.g., confidential), an entity associated with the registry server is not able to know which Internet domain names are being queried for, and is thus prevented from raising prices of those Internet domain names. Additionally, an entity associated with the client device may be provided with an indication of which Internet domain names are available (or are not available) without requiring the list of Internet domain names maintained by the server to be publicized. Such privacy (e.g., due to the techniques described further herein) may also prevent interception of the queries or the Internet domain names by a malicious actor, also referred to as a "Man-in-the-Middle" attack. Although described in the context of querying and exchanging Internet domain names, the techniques of the present disclosure may also apply in other situations, such as exchange of domain record types or for testing and updating DNS records, as non-limiting examples.

Figure 1:
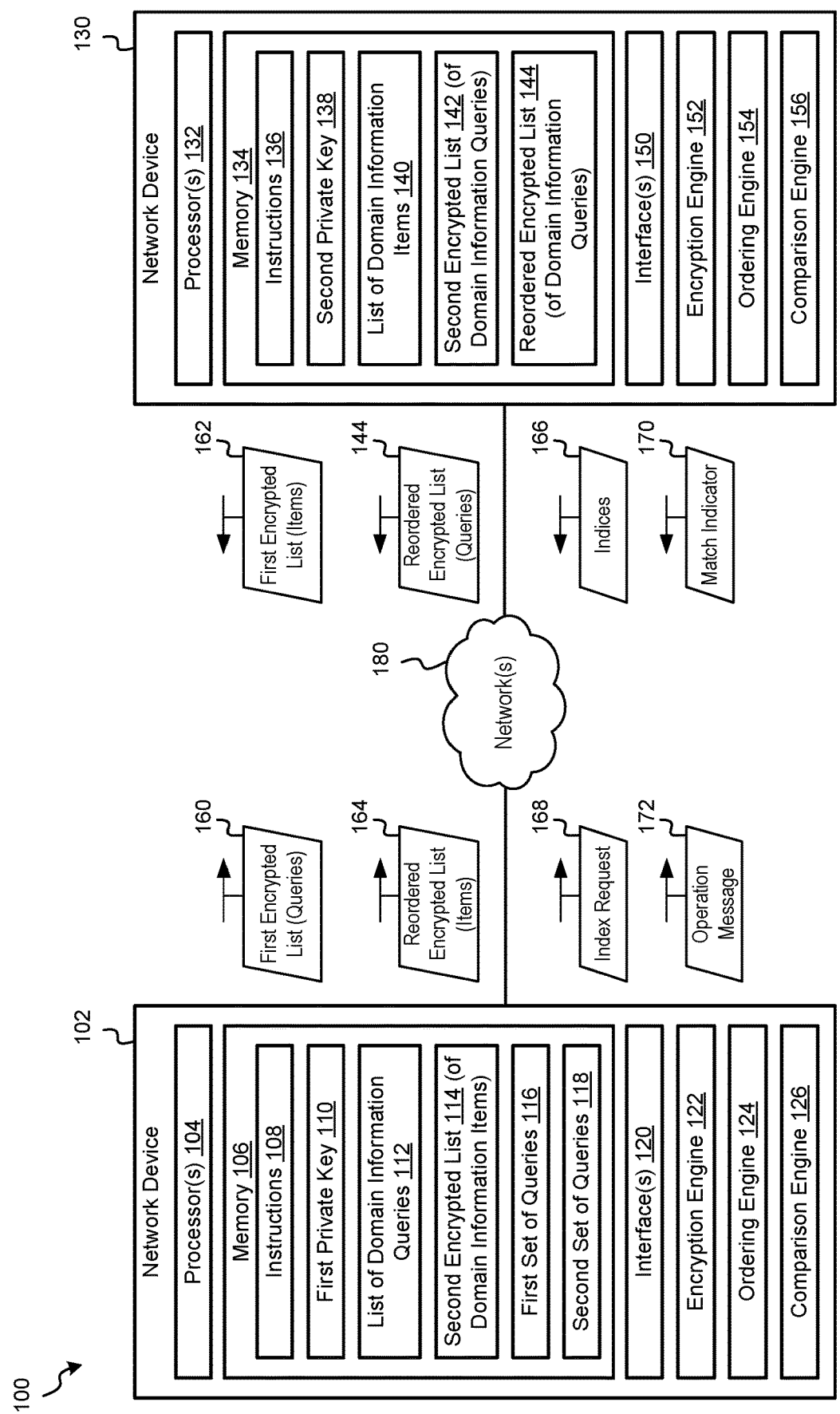
FIG. 1 is a block diagram of an example of a system that supports private querying and exchange of domain information according to one or more aspects.

Referring to FIG. 1, an example of a system that supports private querying and exchange of domain information according to one or more aspects is shown as a system 100. The system 100 may be configured to enable network devices to encrypt and share lists of domain information queries and domain information items in order to identify matches between the domain information queries and the domain information lists while maintaining privacy (e.g., confidentiality) of the domain information queries or the domain information items. To illustrate, the network devices may perform a type of homomorphic encryption, using individual private encryption keys, to prevent decryption of the domain information queries or the domain information items by other devices, such as the receiving device, forwarding devices, or unintentional intercepting devices (e.g., malicious actors). As shown in FIG. 1, the system 100 includes a network device 102, a network device 130, and one or more networks 180. In some implementations, the system 100 may include additional components, such as additional network devices, as a non-limiting example.

The network device 102 (e.g., a client device, a querying device, or a server) may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The network device 102 includes one or more processors 104, a memory 106, one or more communication interfaces 120, an encryption engine 122, an ordering engine 124, and a comparison engine 126. In some other implementations, one or more of the components 122-126 may be optional, one or more additional components may be included in the network device 102, or both. It is noted that functionalities described with reference to the network device 102 are provided for purposes of illustration, rather than by way of limitation and that the exemplary functionalities described herein may be provided via other types of computing resource deployments. For example, in some implementations, computing resources and functionality described in connection with the network device 102 may be provided in a distributed system using multiple servers or other computing devices, or in a cloud-based system using computing resources and functionality provided by a cloud-based environment that is accessible over a network, such as the one of the one or more networks 180. To illustrate, one or more operations described herein with reference to the network device 102 may be performed by one or more servers or a cloud-based system that communicates with one or more servers, registries, or domain services.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the network device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the network device 102 may be stored in the memory 106 as instructions 108 that, when executed by the one or more processors 104, cause the one or more processors 104 to perform the operations described herein with respect to the network device 102, as described in more detail below. Additionally, the memory 106 may be configured to store data and information, such as a first private key 110, a list of domain information queries 112, a second encrypted list 114 of domain information items, a first set of queries 116, and a second set of queries 118. Illustrative aspects of the first private key 110, the list of domain information queries 112, the second encrypted list 114 of domain information items, the first set of queries 116, and the second set of queries 118 are described in more detail below.

The one or more communication interfaces 120 may be configured to communicatively couple the network device 102 to the one or more networks 180 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the network device 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the network device 102. In some implementations, the network device 102 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the network device 102.

The encryption engine 122 may be configured to encrypt data or information using one or more encryption keys accessible to the network device 102. To illustrate, the encryption engine 122 may be configured to encrypt information, such as lists, that are generated by the network device 102 or received by the network device 102 using the first private key 110 (e.g., a private encryption key corresponding to the network device 102). The encryption engine 122 may be configured to use the first private key 110 to perform data encryption, such as Data Encryption Standard (DES) encryption Rivest-Shamir-Adleman (RSA) encryption, Advanced Encryption Standard (AES) encryption, or other types of encryption, as non-limiting examples.

The ordering engine 124 may be configured to change an order of a list (or other ordered structure) of information. For example, the ordering engine 124 may be configured to reorder a list of domain information queries or a list of domain information items. In some implementations, the ordering engine 124 may be configured to reorder a list by randomly, or pseudo-randomly, shuffling the list. In some other implementations, the ordering engine 124 may be configured to perform a fixed reordering of a list, such as selecting one of multiple different fixed reordering operations based on characteristics of the list or randomly selecting one of multiple different fixed reordering operations, as non-limiting examples.

The comparison engine 126 may be configured to compare information to determine if the compared information is the same. For example, the comparison engine 126 may be configured to compare one or more elements of a first list to one or more elements of a second list to determine whether any of the elements of the first list match any of the elements of the second list. As a particular example, the comparison engine 126 may be configured to compare a domain information query from a list of domain information queries to each domain information item of a list of domain information items to determine if the domain information query matches any of the domain information items. The comparison engine 126 may also identify the indices of any elements of one list that match elements of another list. In some implementations, the elements of the lists may be double-encrypted such that the information cannot be fully decrypted by the network device 102. In some such implementations, the comparison engine 126 may perform a string comparison to compare whether a first set of one or more strings that correspond to an element of a first list match any set of one or more strings that correspond to an element of a second list.

The network device 130 (e.g., a server, a repository server, a device operating as a DNS ROOT, a centralized zone data service (CZDS), or the like) may include or correspond to a desktop computing device, a laptop computing device, a personal computing device, a tablet computing device, a mobile device (e.g., a smart phone, a tablet, a PDA, a wearable device, and the like), a server, a VR device, an AR device, an XR device, a vehicle (or a component thereof), an entertainment system, other computing devices, or a combination thereof, as non-limiting examples. The network device 130 includes one or more processors 132, a memory 134, one or more communication interfaces 150, an encryption engine 152, an ordering engine 154, and a comparison engine 156. In some other implementations, one or more of the components 152-156 may be optional, one or more additional components may be included in the network device 130, or both. It is noted that functionalities described with reference to the network device 130 are provided for purposes of illustration, rather than by way of limitation and that the exemplary functionalities described herein may be provided via other types of computing resource deployments. For example, in some implementations, computing resources and functionality described in connection with the network device 130 may be provided in a distributed system using multiple servers or other computing devices, or in a cloud-based system using computing resources and functionality provided by a cloud-based environment that is accessible over a network, such as the one of the one or more networks 180. To illustrate, one or more operations described herein with reference to the network device 130 may be performed by one or more servers or a cloud-based system that communicates with one or more client devices.

The one or more processors 132 may include one or more microcontrollers, ASICs, FPGAs, CPUs having one or more processing cores, or other circuitry and logic configured to facilitate the operations of the network device 130 in accordance with aspects of the present disclosure. The memory 134 may include RAM devices, ROM devices, EPROM, EEPROM, one or more HDDs, one or more SSDs, flash memory devices, NAS devices, or other memory devices configured to store data in a persistent or non-persistent state. Software configured to facilitate operations and functionality of the network device 130 may be stored in the memory 134 as instructions 136 that, when executed by the one or more processors 132, cause the one or more processors 132 to perform the operations described herein with respect to the network device 130, as described in more detail below. Additionally, the memory 134 may be configured to store data and information, such as a second private key 138, a list of domain information items 140, a second encrypted list 142 of domain information queries, and a reordered encrypted list 144 of domain information queries. Illustrative aspects of the second private key 138, the list of domain information items 140, the second encrypted list 142 of domain information queries, and the reordered encrypted list 144 of domain information queries are described in more detail below.

The one or more communication interfaces 150 may be configured to communicatively couple the network device 130 to the one or more networks 180 via wired or wireless communication links established according to one or more communication protocols or standards (e.g., an Ethernet protocol, a TCP/IP, an IEEE 802.11 protocol, an IEEE 802.16 protocol, a 3G communication standard, a 4G/LTE communication standard, a 5G communication standard, and the like). In some implementations, the network device 130 includes one or more I/O devices that include one or more display devices, a keyboard, a stylus, one or more touchscreens, a mouse, a trackpad, a microphone, a camera, one or more speakers, haptic feedback devices, or other types of devices that enable a user to receive information from or provide information to the network device 130. In some implementations, the network device 130 is coupled to the display device, such as a monitor, a display (e.g., a LCD or the like), a touch screen, a projector, a VR display, an AR display, an XR display, or the like. In some other implementations, the display device is included in or integrated in the network device 130.

The encryption engine 152 may be configured to encrypt data or information using one or more encryption keys accessible to the network device 130. To illustrate, the encryption engine 152 may be configured to encrypt information, such as lists, that are generated by the network device 130 or received by the network device 130 using the second private key 138 (e.g., a private encryption key corresponding to the network device 130). The encryption engine 152 may be configured to use the second private key 138 to perform data encryption, such as DES encryption, RSA encryption, AES encryption, or other types of encryption, as non-limiting examples.

The ordering engine 154 may be configured to change an order of a list (or other ordered structure) of information. For example, the ordering engine 154 may be configured to reorder a list of domain information queries or a list of domain information items. In some implementations, the ordering engine 154 may be configured to reorder a list by randomly, or pseudo-randomly, shuffling the list. In some other implementations, the ordering engine 154 may be configured to perform a fixed reordering of a list, such as selecting one of multiple different fixed reordering operations based on characteristics of the list or randomly selecting one of multiple different fixed reordering operations, as non-limiting examples.

The comparison engine 156 may be configured to compare information to determine if the compared information is the same. For example, the comparison engine 156 may be configured to compare one or more elements of a first list to one or more elements of a second list to determine whether any of the elements of the first list match any of the elements of the second list. As a particular example, the comparison engine 156 may be configured to compare a domain information query from a list of domain information queries to each domain information item of a list of domain information items to determine if the domain information query matches any of the domain information items. The comparison engine 156 may also identify the indices of any elements of one list that match elements of another list. In some implementations, the elements of the lists may be double-encrypted such that the information cannot be fully decrypted by the network device 130. In some such implementations, the comparison engine 156 may perform a string comparison to compare whether a first set of one or more strings that correspond to an element of a first list match any set of one or more strings that correspond to an element of a second list.

During operation of the system 100, the network device 102 may generate the list of domain information queries 112 for querying the network device 130. For example, the list of domain information queries 112 may include availability queries for multiple Internet domain names, as a non-limiting example. In some implementations, the network device 102 may receive a user input that indicates user selection of the domain information queries, and the network device 102 may generate the list of the domain information queries 112 based on the user input. Additionally or alternatively, the network device 102 may determine the domain information queries in other manners, such as by receiving an indication of the domain information queries from an application executed by the network device 102 or by extrapolating related names to a domain name indicated by the user input, as non-limiting examples.

The encryption engine 122 may encrypt the list of domain information queries 112 (e.g., Internet domain names) based on the first private key 110 to generate a first encrypted list 160 of domain information queries. For example, the encryption engine 122 may perform cryptographic encryption on each Internet domain name to be queried based on the first private key 110 to generate a list of strings (e.g., the first encrypted list 160) that corresponds to the list of domain information queries 112. Because the first private key 110 is inaccessible to other devices, the first encrypted list 160 is not able to be decrypted by other devices, such as the network device 130 or a device that intercepts transmission of the first encrypted list 160. After encrypting the first encrypted list 160, the network device 102 transmits the first encrypted list 160 to the network device 130.

Based on receiving the first encrypted list 160 (or an earlier request to initiate a domain information query process) from the network device 102, the network device 130 (e.g., a registry server, a ROOT device, a CZDS, etc.) may access the list of domain information items 140 maintained by the network device 130 for exchanging with the network device 102. As used herein, domain information "items"

may include or correspond to domain names (e.g., Internet domain names), domain name record types, domain name record values (e.g., Internet protocol (IP) addresses and the like), other DNS or network domain related information, or a combination thereof, that are stored or maintained by the network device 130. As a non-limiting example, the list of domain information items 140 may include multiple Internet domain names that are registered by, owned by, or allocated to an entity associated with the network device 130 and that are in use or have already been leased to or allocated to another entity, such that the Internet domain names are not available for purchase, leasing, or the like, from the entity associated with the network device 130.

The encryption engine 152 may encrypt the list of domain information items 140 (e.g., Internet domain names) based on the second private key 138 to generate a first encrypted list 162 of domain information items. For example, the encryption engine 152 may perform cryptographic encryption on each Internet domain name of the list based on the second private key 138 to generate a list of strings (e.g., the first encrypted list 162) that corresponds to the list of domain information items 140. The second private key 138 is distinct from (e.g., is not the same as, and does not result in the same encryption and decryption as) the first private key 110. Because the second private key 138 is inaccessible to other devices, the first encrypted list 162 is not able to be decrypted by other devices, such as the network device 102 or a device that intercepts transmission of the first encrypted list 162. After encrypting the first encrypted list 162, the network device 130 transmits the first encrypted list 162 to the network device 102.

In addition, the network device 130 may receive the first encrypted list 160 of the domain information queries from the network device 102 and encrypt the first encrypted list 160. For example, the encryption engine 152 may encrypt the first encrypted list 160 based on the second private key 138 to generate the second encrypted list 142 of domain information queries. Because the first encrypted list 160 is already encrypted based on the first private key 110 when received by the network device 130, encrypting the first encrypted list 160 based on the second private key 138 may be referred to as "double-encrypting" the list. In some implementations, the network device 102 and the network device 130 may be configured to perform homomorphic encryption using the first private key 110 and the second private key 138, respectively. As a property of homomorphic encryption, information that is encrypted by two different encryption keys may be the same, in double-encrypted form, regardless of which encryption key is used in the first encryption and which encryption key is used in the second encryption. For example, a particular domain information query that is first encrypted by the network device 102 based on the first private key 110 and then encrypted by the network device 130 based on the second private key 138 will result in the same string as the particular domain information query being first encrypted by the network device 130 based on the second private key 138 and then encrypted by the network device 102 based on the first private key 110.

After encrypting the second encrypted list 142 of domain information queries, the network device 130 may reorder the second encrypted list 142. For example, the ordering engine 154 may reorder the second encrypted list 142 to generate a reordered encrypted list 144 of domain information queries. In some implementations, the ordering engine 154 may be configured to randomly reorder the second encrypted list 142 (e.g., perform a random shuffle on the second encrypted list 142). In some implementations, after generating the reordered encrypted list 144, the network device 130 may transmit the reordered encrypted list 144 to the network device 102.

Similar to the network device 130, the network device 102 may receive the first encrypted list 162 of the domain information items from the network device 130 and encrypt the first encrypted list 162. For example, the encryption engine 122 may encrypt the first encrypted list 162 based on the first private key 110 to generate the second encrypted list 114 of domain information items (e.g., a double-encrypted list of domain information items). After encrypting the second encrypted list 114 of domain information items, the network device 102 may reorder the second encrypted list 114. For example, the ordering engine 124 may reorder the second encrypted list 114 to generate a reordered encrypted list 164 of domain information items. In some implementations, the ordering engine 124 may be configured to randomly reorder the second encrypted list 114 (e.g., perform a random shuffle on the second encrypted list 114). After the reordering, the network device 102 may transmit the reordered encrypted list 164 to the network device 130.

Based on receiving the reordered encrypted list 164 of domain information items (e.g., a shuffled double-encrypted list of domain information items), the network device 130 may determine whether any elements of the reordered encrypted list 164 match any elements of the second encrypted list 142 of domain information queries. For example, the network device 130 may cache the first encrypted list 160 of domain information queries, and the network device 130 may retrieve the cached first encrypted list 160 and encrypt the retrieved first encrypted list 160 to generate the double-encrypted list of domain information queries for comparing to the reordered encrypted list 164. Alternatively, the network device 130 may cache the second encrypted list 142 of domain information queries upon generation of the second encrypted list 142, and the network device 130 may retrieve the cached second encrypted list 142 for comparing to the reordered encrypted list 164. After retrieval or generation of the second encrypted list 142, the comparison engine 156 may compare the second encrypted list 142 of domain information queries to the reordered encrypted list 164 of domain information items to determine if there are matching elements within the two lists. For example, due to the properties of the homomorphic encoding, if a domain information query (e.g., an Internet domain name being queried for by the entity associated with the network device 102) in the second encrypted list 142 is the same as a domain information item (e.g., an Internet domain name available to the entity associated with the network device 130) in the reordered encrypted list 164, without any encryption, then after encryption based on both the first private key 110 and the second private key 138, the encrypted strings will match. Thus, the network device 130 may be able to determine whether a domain information query matches domain information maintained by the network device 130 without being able to decrypt the domain information query.

Additionally, because the comparison engine 156 compares the reordered encrypted list 164 to the second encrypted list 142, which is not reordered, the comparison engine 156 may be able to identify the index or indices of one or more matching elements of the second encrypted list 142, which can be used by the network device 102 to identify which domain information queries result in matches and which domain information queries result in no matches (e.g., would result a no existing domain (NXDOMAIN) or (NXD) response using conventional DNS queries). For example, if the second encrypted list 142 includes four elements, and the first element and the third element of the second encrypted list 142 match elements of the reordered encrypted list 164, the comparison engine 156 may identify indices one and three as indices 166. Details of comparing the various lists to identify matches is further described herein with reference to FIGS. 2-8. The network device 130 may transmit the indices 166 to the network device 102 to enable identification of the corresponding domain information queries. Because the network device 130 is unable to fully decrypt the second encrypted list 142 or the reordered encrypted list 164, the particular domain information items that match queries from the network device 102 are kept private and confidential from the network device 130 (and any device that intercepts the encrypted lists or the indices 166). If no element of the second encrypted list 142 matches any element of the reordered encrypted list 164, the network device 130 may transmit a match indicator 170 that indicates no match is detected to the network device 102. The match indicator 170 may include a null indication, a null index value, or the like. Alternatively, the match indicator 170 may indicate that a match has been detected, such as by including a flag having a particular value, including a particular message header, or the like. In some implementations, the network device 130 may transmit the indices 166, or the match indicator 170, in response to receiving an index request, as further described below.

The network device 102 may receive the indices 166 from the network device 130, and the network device 102 may identify domain information queries from the list of domain information queries 112 as the first set of queries 116. For example, the network device 102 may identify one or more queries in the list of domain information queries 112 that correspond to the indices 166 as the first set of queries 116. Thus, the network device 102 may receive the indices 166 instead of a NXDOMAIN or NXD response, which may prevent other devices from being able to determine which queries are satisfied. For example, because the domain information queries and domain information items are encrypted before transmission, other devices (such as the network device 130 or an intercepting device) are unable to decrypt the received information to read the Internet domain names corresponding to the queries. Although the indices 166 may be communicated without encryption, the indices 166 are not useful without the ability to decrypt the encrypted domain information queries. Thus, neither the network device 130 or any intercepting device (e.g., a device of a malicious actor, such as a man-in-the-middle attacker) is able to determine which Internet domain names are being queried or are satisfied, unlike if a conventional NXD response was transmitted to the network device 102. Additionally or alternatively, the network device 102 may identify the second set of queries 118 based on the indices 166. For example, the network device 102 may identify one or more queries in the list of domain information queries 112 that do not correspond to any of the indices 166 as the second set of queries 118.

In some implementations, the first set of queries 116 may include Internet domain names that are registered to the entity associated with the network device 130 and are used by the entity or allocated to another entity, such that the Internet domain names are not available for purchasing, leasing, or the like. Additionally or alternatively, the second set of queries 118 may include Internet domain names that are available (e.g., that are not use by the entity associated with the network device 130 or allocated to another entity). In some implementations, the network device 102 may initiate performance of one or more operations based on the first set of queries 116, the second sect of queries 118, or both. For example, the network device 102 may transmit an operation message 172 that indicates a request for or an initiation of one or more operations corresponding to the first set of queries 116, the second set of queries 118, or both. Non-limiting examples of the operations indicated by the operation message 172 include purchasing one or more Internet domain names indicated by the second set of queries 118, leasing one or more Internet domain names indicated by the second set of queries 118, requesting record values (e.g., IP addresses or the like) associated with one or more Internet domain names indicated by the first set of queries 116, or a combination thereof.

The network device 102 may generate an output to cause display of the first set of queries 116, the second set of queries 118, or both. For example, the network device 102 may provide an output to a display device that is integrated within the network device 102 or coupled to the network device 102 that causes the display device to display a user interface (UI) that includes the Internet domain names that correspond to the first set of queries 116, the Internet domain names that correspond to the second set of queries 118, or both. In some implementations, the Internet domain names that correspond to the first set of queries 116 may be visually indicated in a different manner than the Internet domain names that correspond to the second set of queries 118, such as via different color or font of text, different locations within the UI, different section headers, different graphics, or the like. Additionally or alternatively, the UI may include additional information, such as record types associated with the first set of queries 116 and the second set of queries 118, record values (e.g., IP addresses or the like) associated with the first set of queries 116 and the second set of queries 118, purchasing or leasing information associated with the second set of queries 118, registration information associated with the first set of queries 116, other information, or a combination thereof.

In some implementations, the network device 102 may receive the reordered encrypted list 144 of domain information queries from the network device 130. In some such implementations, the comparison engine 126 may compare the second encrypted list 114 of domain information items (or the reordered encrypted list 164 of domain information items) to the reordered encrypted list 144 to determine if any match between the lists. If at least one element of the second encrypted list matches any element of the reordered encrypted list 144 (e.g., based on a string comparison), the network device 102 may determine that at least one Internet domain name (e.g., domain information item) that is registered to the entity associated with the network device 130 and is available matches one of the Internet domain names in the list of domain information queries 112. Based on this determination, the network device 102 may transmit an index request 168 to the network device 130. The index request 168 may request indices of any domain information queries that match domain information items, as determined by the network device 130. Based on receiving the index request 168 from the network device 102, the network device 130 may transmit the indices 166 to the network device 102. Thus, in some implementations, determination and transmission of the indices 166 by the network device 130 may be conditioned upon receipt of the index request 168.

Although described above in the context of queries for domain names (e.g., Internet domain names), in other implementations, the domain information queries and domain information items may include other information. As a non-limiting example, the network device 130 may be configured to operate as an authoritative resolver for specific domain name records, and the domain information queries and the domain information elements may include, prior to encryption, both domain names and domain name record types (e.g., DNS names and DNS record types). To illustrate, the domain names may include Internet addresses (e.g., uniform resource locators (URLs)), such as www.example.com or www.example3.com, and the domain name record types may include A records (e.g., address records) and AAAA records (e.g., Internet protocol version 6 (IPv6) address records), as non-limiting examples. In some such implementations, the encryption of the domain name record types as described herein may preserve privacy and confidentiality of the domain name record types as compared to a typical No-DNS data response that would be issued by conventional DNS query systems. As another non-limiting example, the network device 102 and the network device 130 may be configured to operate as DNS resolvers but may not be authorized to share zones, and the domain information queries and the domain information elements may include, prior to encryption, domain names, domain name record types, and domain name record values (e.g., DNS names, DNS record types, and DNS record values). To illustrate, the domain names may include Internet addresses (e.g., URLs), such as www.example.com or www.example3.com, the domain name record types may include A records (e.g., address records) and AAAA records (e.g., IPv6 address records), and the domain name record values may include IP addresses, domain addresses, subdomain addresses, or the like, such as 192.168.0.27 or 2606:2800:220::1, as non-limiting examples. In some such examples, the network device 102 may query the network device 130 to determine whether existing DNS records maintained by the network device 102 are up to date (e.g., to identify DNS records which may no longer exist or be out of date) without disclosing the DNS records maintained at the network device 102 to the network device 130 or to other devices, such as intercepting devices.

As another example, the network device 130 may correspond to a business that stores domain names for an entire zone or top level domain (TLD) and that charges for access to a list of the domain names or requires an application programming interface (API) call to access the list, which is recorded. In such an example, the above-described techniques may be used to enable the entity associated with the network device 102 to determine whether the list of domain names includes particular domain names of interest without being charged to access the list and without requiring use of API calls that are recorded by the network device 130. Additionally, the business is able to provide the requests to particular queries without disclosing the entire list of domain names, which preserves the confidentiality of the list. As another example, the network device 102 and the network device 130 may each be servers that maintain domain name records for respective zones (which may overlap or be the same zone). In such an example, the network device 102 may maintain both intranet and extranet addresses, and due to privacy concerns, only the extranet addresses are desired to be shared externally. Instead of relying on sharing the entire list of records at the network device 102 with a trusted or semi-trusted DNS resolver, the techniques described above enable the network device 102 to query to determine which domain name records are out of date while maintaining confidentiality of the DNS records stored at the network device 102 (and similarly of the DNS records stored at the network device 130).

As described above, the system 100 supports encrypted querying and exchange of domain information, such as DNS names, DNS record types, DNS record values, and the like, between multiple devices (e.g., the network device 102 and the network device 130). Because the domain information queries and domain information items are encrypted using corresponding private keys, the domain information queries and the domain information items are kept private and confidential (e.g., only devices with access to the respective private keys can decrypt the domain information queries or the domain information items). However, due to the properties of homomorphic encryption, the network devices 102 and 130 are able to determine whether or not domain information queried by the network device 102 matches available domain information items registered to the entity associated with the network device 130 without having to decrypt the received lists. Thus, the system 100 enables the network device 102 to determine whether the network device 130 maintains particular domain information without disclosing the particular domain information, such as would result from receipt of a NXD response (which is not secure or confidential). Maintaining privacy of the particular domain information queried by the network device 102 may prevent the entity associated with the network device 130 from increasing the cost associated with acquiring the particular domain information, such as a particular Internet domain address, as a non-limiting example. Maintaining the privacy of the particular domain information may also prevent other devices (e.g., devices of hackers or other malicious actors) that intercept messages between the network device 102 and the network device 130 from acquiring the particular domain information (e.g., domain squatting) or performing other attacks, such as spoofing, man-in-the-middle tampering, poisoning, or DNS hijacking, to attack, censor, or track the network device 102 or the network device 130. Additionally, the available domain information names (or other information) maintained by the network device 130 is not disclosed to the network device 102, or to any other intercepting device, such as by performing a DNS zone transfer in response to receiving an AXFR query. The techniques described with reference to FIG. 1 may also be combined with existing DNS security methods, such as DNS security extensions (DNSSEC), virtual private networks (VPNs), DNS query name minimization (DNS QName minimization), Tor clients, or DNS-over-HTTPS (DoH), for enhanced privacy and confidentiality.

Referring to FIGS. 2-8, operations of an example private domain information exchange process are shown. As shown in FIGS. 2-8, the operations may be performed by a client (e.g., a client device) and a registry (e.g., a registry device), such as the network device 102 and the network device 103 of FIG. 1, respectively. In some other implementations, the operations described with reference to the client may be performed by another type of device, such as a server or a DNS resolver, as non-limiting examples, and the operations described with reference to the registry may be performed by another type of device, such as a DNS ROOT device, a server, a DNS resolver, or an authoritative DNS resolver, as non-limiting examples.

Figure 2:
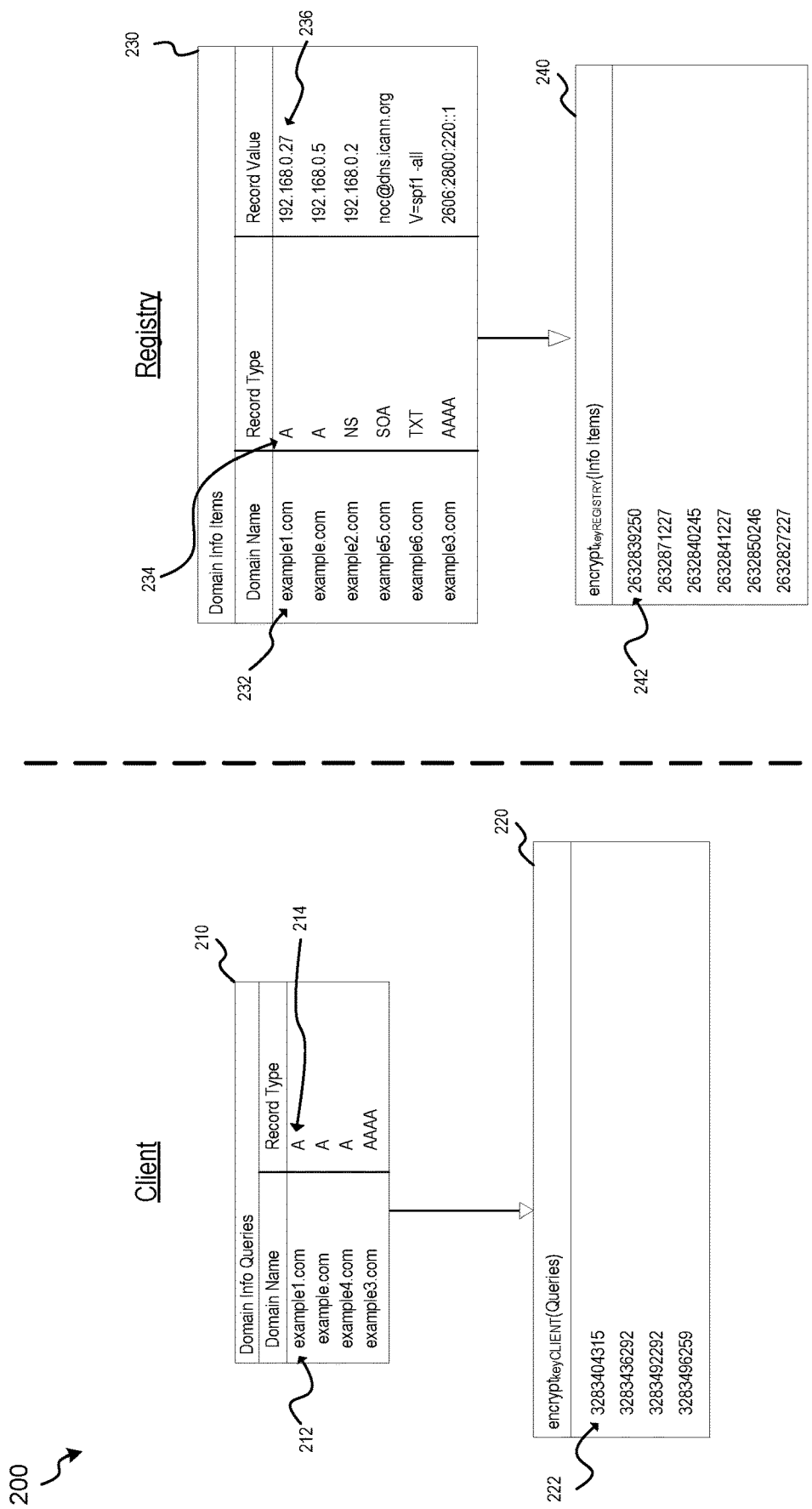
FIGS. 2-8 are diagrams that each illustrate one or more operations of an example private domain information exchange process, according to one or more aspects.

FIG. 2 illustrates operations 200 performed by the client and the registry. As shown in FIG. 2, the client may generate a list of domain information queries 210. In some implementations, the list of domain information queries 210 may include or correspond to the list of domain information queries 112 of FIG. 1. The list of domain information queries 210 may be generated based on user input indicated domain information to query, based on indications from one or more applications executed by the client, or in other manners. In some implementations, the domain information queries may be separated into different lists by top level domain (TLD), such as ".com", ".org", ".net", or the like. Additionally or alternatively, the list of domain information queries 210 may include one or more domain names that are not requested by the client. For example, including a large number of domain information queries in the list of domain information queries 210 may improve the security and decrease the likelihood of another party being able to infer (e.g., guess) or brute force determine the domain names being queried, such as by gaining access to a portion of a list of domain names stored at the client and trying all possible combinations.

In the implementation shown in FIG. 2, each domain information query may include a domain name and a domain name record type. For example, an illustrative first domain query may include a first domain name 212 ("example1.com") and a first domain name record type 214 ("A"). In some implementations, the domain names may correspond to Internet domain names, such as URLs, and the record types may correspond to DNS record types, such as A, AAAA, and the like. The list of domain information queries 210 may be ordered (e.g., from top to bottom in the orientation shown in FIG. 2). For example, the domain information query for the domain name "example1.com" may have an index of one, the domain information query for the domain name "example.com" may have an index of two, the domain information query for the domain name "example4.com" may have an index of three, and the domain information query for the domain name "example3.com" may have an index of four.

After generating the list of domain information queries 210, the client may encrypt the list of domain information queries 210 to generate a first encrypted list 220 of domain information queries. For example, the client may encrypt the list of domain information queries 210 using a private key, referred to herein as encryptkey$_{client}$, to encrypt each domain information query into a respective string (or set of one or more strings). For example, the client may encrypt a combination of the first domain name 212 and the first domain name record type 214 to generate a first encrypted string 222 ("3283404315"). The private key encryptkey$_{client}$ may be used to perform cryptographic encryptions, such as DES encryption, RSA encryption, AES encryption, or other types of encryption, as non-limiting examples. In some implementations, the private key encryptkey$_{client}$ may include or correspond to the first private key 110 of FIG. 1.

Additionally shown in FIG. 2, the registry may access a list of domain information items 230. In some implementations, the list of domain information items 230 may include or correspond to the list of domain information items 140 of FIG. 1. The list of domain information items 230 may include internet domain names that are registered by, owned by, or allocated to an entity associated with the registry and that are not already leased to or allocated to another entity, such that the internet domain names are available for purchasing, leasing, or the like. In the implementation shown in FIG. 2, each domain information item may include a domain name, a domain record type, and a domain record value. For example, an illustrative first domain information item may include a second domain name 232 ("example1.com"), a second domain record type 234 ("A"), and a domain record value 236 ("192.168.0.27"). In some implementations, the domain names may correspond to Internet domain names, such as URLs, the domain name record types may correspond to DNS record types, such as A, AAAA, name server record (NS), start of a zone of authority record (SOA), text record (TXT), and the like, and the domain name record values may correspond to IP addresses or other addresses used by computers and electronic devices to access the corresponding domain. The list of domain information items 230 may be ordered (e.g., from top to bottom in the orientation shown in FIG. 2). For example, the domain information item for the domain name "example1.com" may have an index of 1, the domain information item for the domain name "example.com" may have an index of 2, the domain information item for the domain name "example2.com" may have an index of 3, the domain information item for the domain name "example5.com" may have an index of 4, the domain information item for the domain name "example6.com" may have an index of 5, the domain information item for the domain name "example3.com" may have an index of 6.

After accessing the list of domain information items 230, the registry may encrypt the list of domain information items 230 to generate a first encrypted list 240 of domain information items. For example, the registry may encrypt the list of domain information items 230 using a private key, referred to herein as encryptkey$_{registry}$, to encrypt each domain information item into a respective string (or set of one or more strings). For example, the registry may encrypt a combination of the second domain name 232, the second domain record type 234, and the second domain record value 236 to generate a second encrypted string 242 ("2632839250"). The private key encryptkey$_{registry}$ may be used to perform cryptographic encryptions, such as DES encryption, RSA encryption, AES encryption, or other types of encryption, as non-limiting examples. In some implementations, the private key encryptkey$_{registry}$ may include or correspond to the second private key 138 of FIG. 1. The private key encryptkey$_{registry}$ is private to the registry and is distinct from the private key encryptkey$_{client}$, which is private to the client. In some implementations, the registry may cache the first encrypted list 240.

Figure 3:
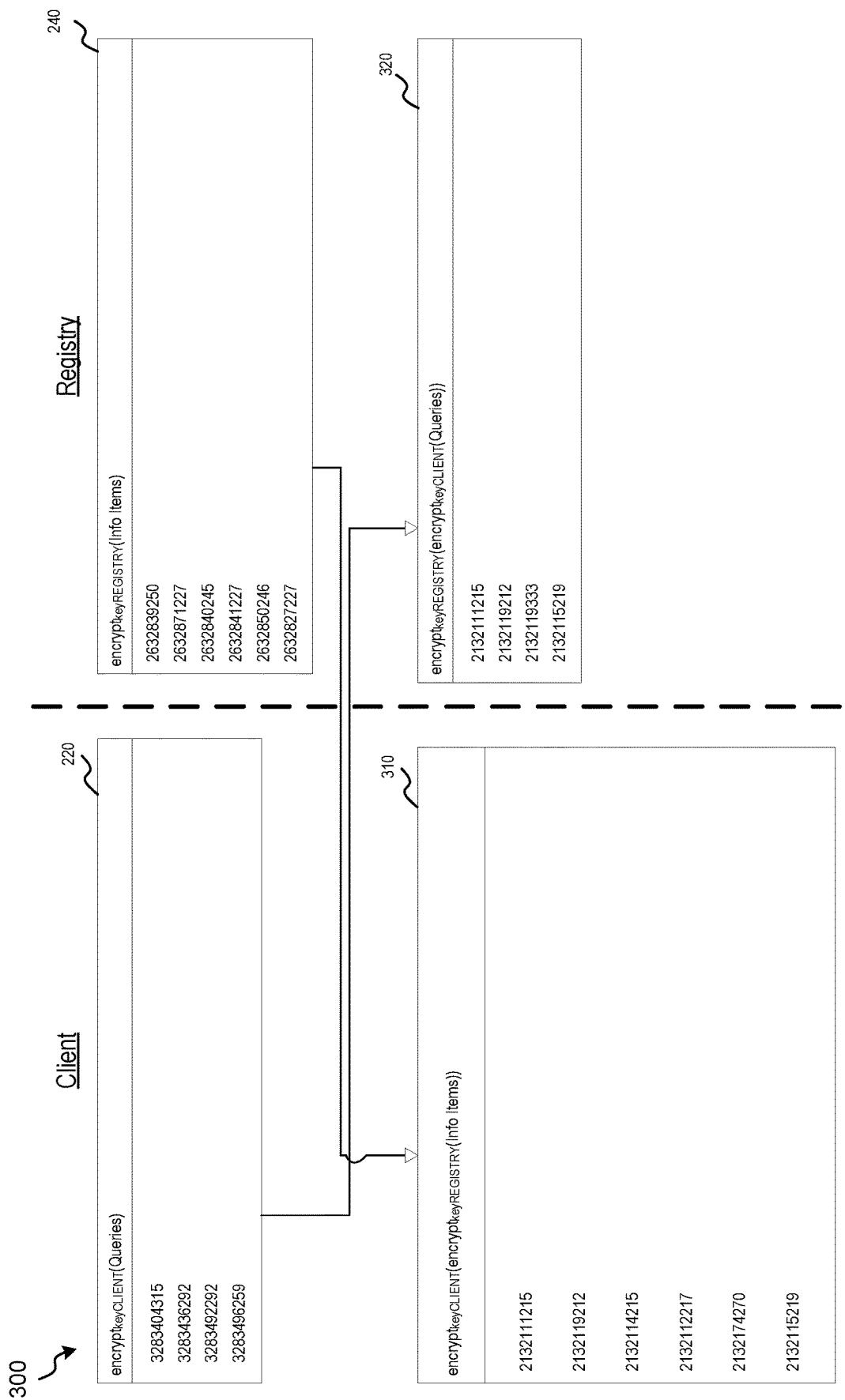

FIG. 3 illustrates operations 300 performed by the client and the registry after the operations 200 of FIG. 2. As shown in FIG. 3, the client and the registry may exchange their respective encrypted lists. To illustrate, the client may transmit the first encrypted list 220 of domain information queries to the registry. Similarly, the registry may transmit the first encrypted list 240 of the domain information items to the client. Responsive to receiving the first encrypted list 240, the client may encrypt the first encrypted list 240 using the private key encryptkey$_{client}$ to generate a second encrypted list 310 of the domain information items. The second encrypted list 310 may be referred to as a double-encrypted list of the domain information items due to the initial encryption by the registry using the private key encryptkey$_{registry}$ and the subsequent encryption by the client using the private key encryptkey$_{client}$. As a non-limiting example, the encrypted string "2632839250" may be encrypted by the client using the private key encryptkey$_{client}$ to generate a double-encrypted string "2132111215." Additionally, responsive to receiving the first encrypted list 220 of the domain information queries, the registry may encrypt the first encrypted list 220 using the private key encryptkey$_{registry}$ to generate a second encrypted list 320 of the domain information queries. The second encrypted list 320 may be referred to as a double-encrypted list of the domain information queries due to the initial encryption by the client using the private key encryptkey$_{client}$ and the subsequent encryption by the registry using the private key encryptkey$_{registry}$. As a non-limiting example, the encrypted string "32834043150" may be encrypted by the registry using the private key encryptkey$_{registry}$ to generate a double-encrypted string "2132111215." As shown in FIG. 3, some of the entries of the lists 310 and 320 may be the same after the respective double-encryptions, due to the properties of homomorphic encryption, as described above with reference to FIG. 1. In some implementations, the registry may cache the second encrypted list 320.

Figure 4:
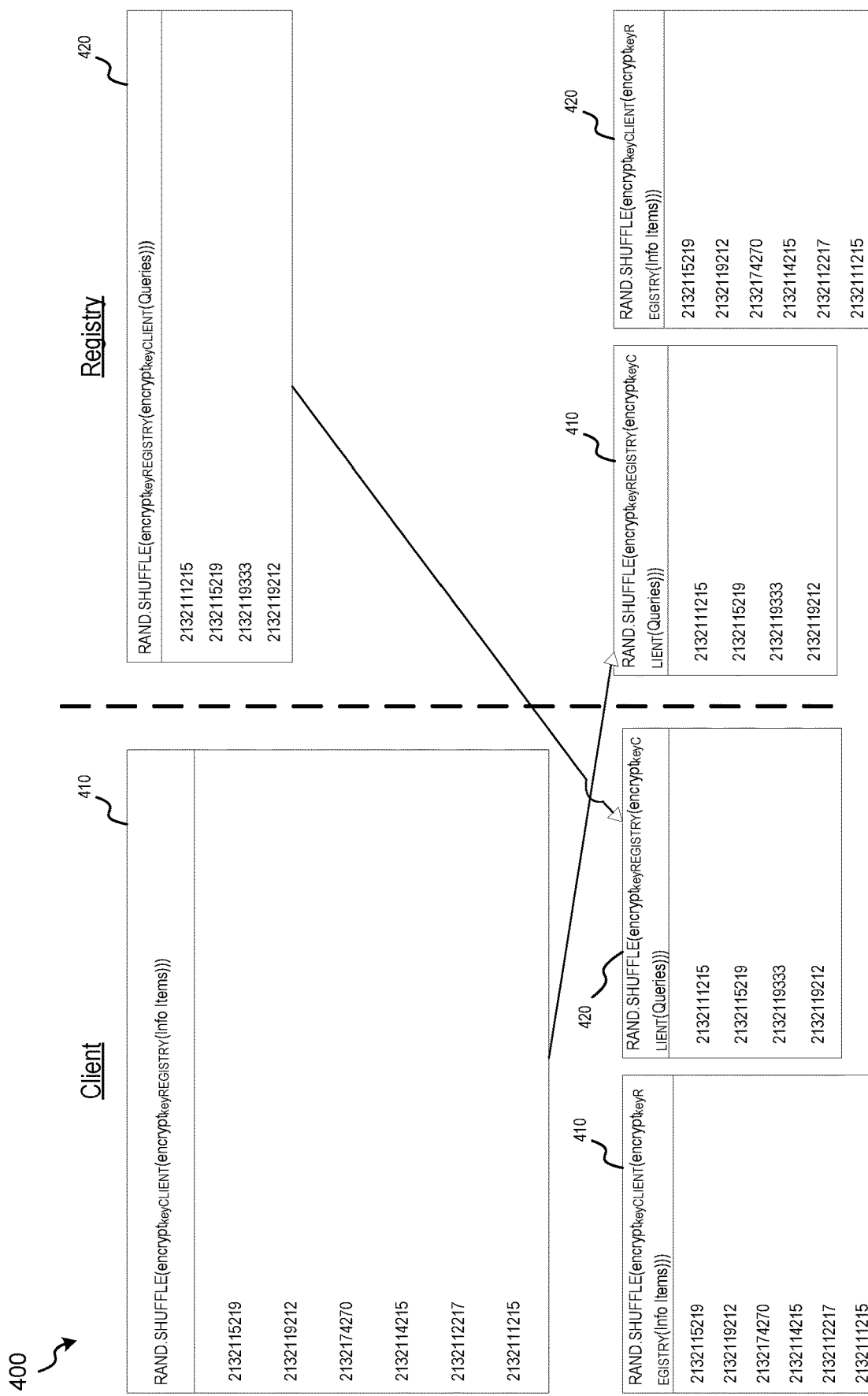

FIG. 4 illustrates operations 400 performed by the client and the registry after the operations 300 of FIG. 3. As shown in FIG. 4, the client may reorder the second encrypted list 310 of the domain information items to generate a reordered list 410 of the domain information items. In the implementation shown in FIG. 4, the client randomly reorders or shuffles the second encrypted list 310 to generate the reordered list 410, also referred to herein as the randomly shuffled list 410 of domain information items. In some other implementations, the client may perform a different type of reordering, such as selecting one of multiple pre-stored reordering algorithms to reorder the second encrypted list 310.

Similarly, the registry may reorder the second encrypted list 320 of the domain information queries to generate a reordered list 420 of the domain information queries. In the implementation shown in FIG. 4, the registry randomly reorders or shuffles the second encrypted list 320 to generate the reordered list 420, also referred to herein as the randomly shuffled list 420 of domain information queries. In some other implementations, the registry may perform a different type of reordering, such as selecting one of multiple pre-stored reordering algorithms to reorder the second encrypted list 320.

After reordering their respective lists, the client and the registry may exchange the reordered lists. For example, the client may transmit the randomly shuffled list 410 of domain information items to the registry. Similarly, the registry may transmit the randomly shuffled list 420 of domain information queries to the client. Thus, after performance of the operations 400, each of the client and the registry may store the two reordered lists (e.g., the randomly shuffled list 410 of domain information items and the randomly shuffled list of domain information queries).

Figure 5:
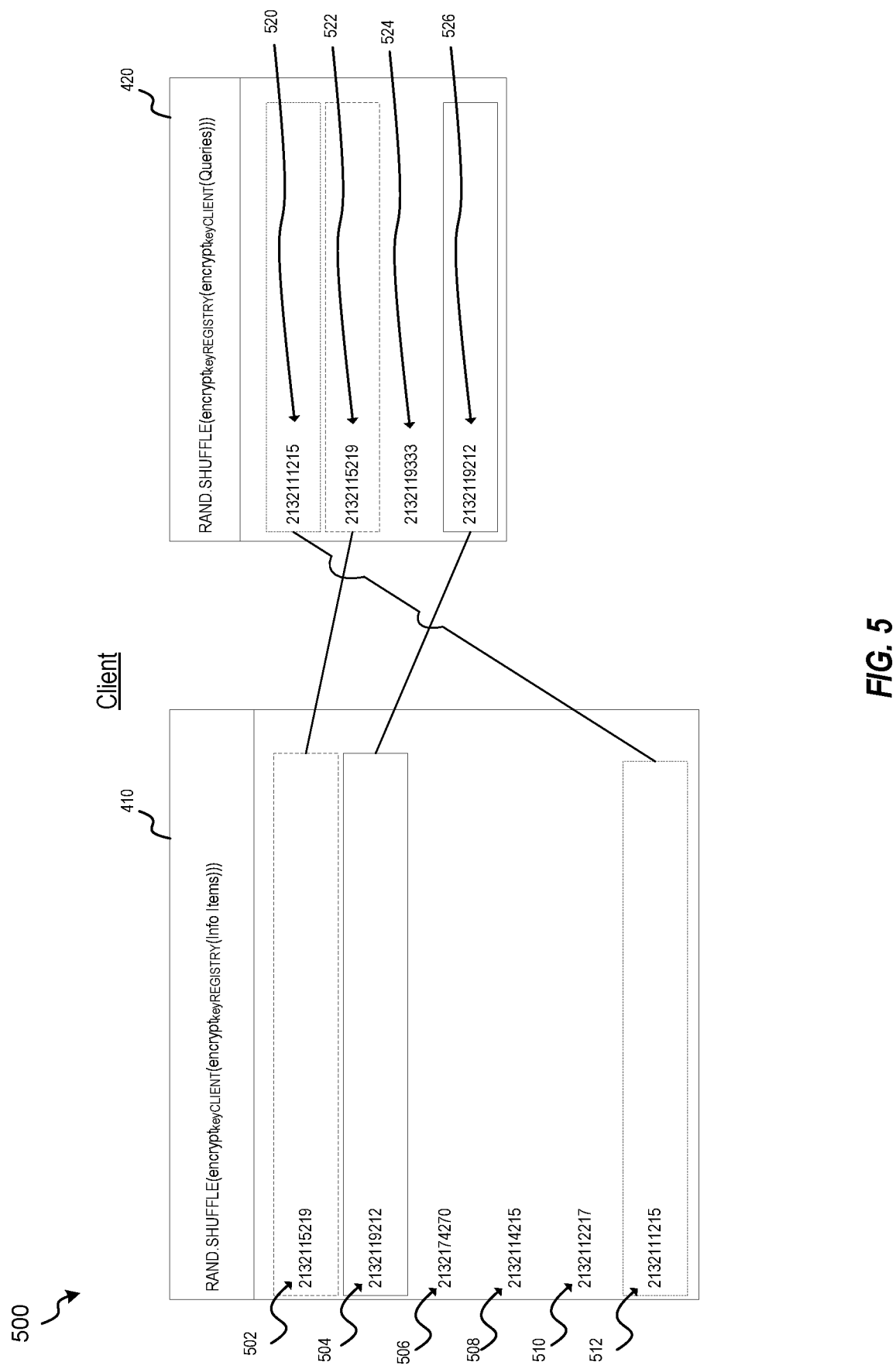

FIG. 5 illustrates operations 500 performed by the client after the operations 400 of FIG. 4. As shown in FIG. 5, the client may compare the randomly shuffled list 410 of domain information items to the randomly shuffled list 420 of domain information queries to identify if any matches exist. Due to the properties of homomorphic encryption, a domain name that is encrypted using the private key encryptkey$_{client}$ and the private key encryptkey$_{registry}$, in either order, will result in the same encrypted string. Thus, if an element of the randomly shuffled list 410 matches any element of the randomly shuffled list 420, the client may determine that at least one query is satisfied (e.g., is associated with a domain name that is available at the registry), which would conventionally be indicated by the registry providing a NXDOMAIN response. As shown in FIG. 5, because three of the domain names associated with the list of domain information queries 210 of FIG. 2 matched three domain names associated with the list of domain information items 230, three elements of the randomly shuffled list 410 match three elements of the randomly shuffled list 420. In the example shown in FIG. 5, a first element 502 (e.g., a first double-encrypted string) of the randomly shuffled list 410 matches a second element 522 (e.g., a second double-encrypted string) of the randomly shuffled list 420. A second element 504 of the randomly shuffled list 410 matches a fourth element 526 of the randomly shuffled list 420, and a sixth element 512 of the randomly shuffled list 410 matches a first element 520 of the second randomly shuffled list 420. Additionally, a third element 506, a fourth element 508, and a fifth element 510 of the randomly shuffled list 410 do not match any elements of the randomly shuffled list 420, and a third element 524 of the randomly shuffled list 420 does not match any elements of the randomly shuffled list 410. At this point, the client is aware that the registry has three of the queried domain names—but not which three domain names of the four initially queried domain names.

Figure 6:
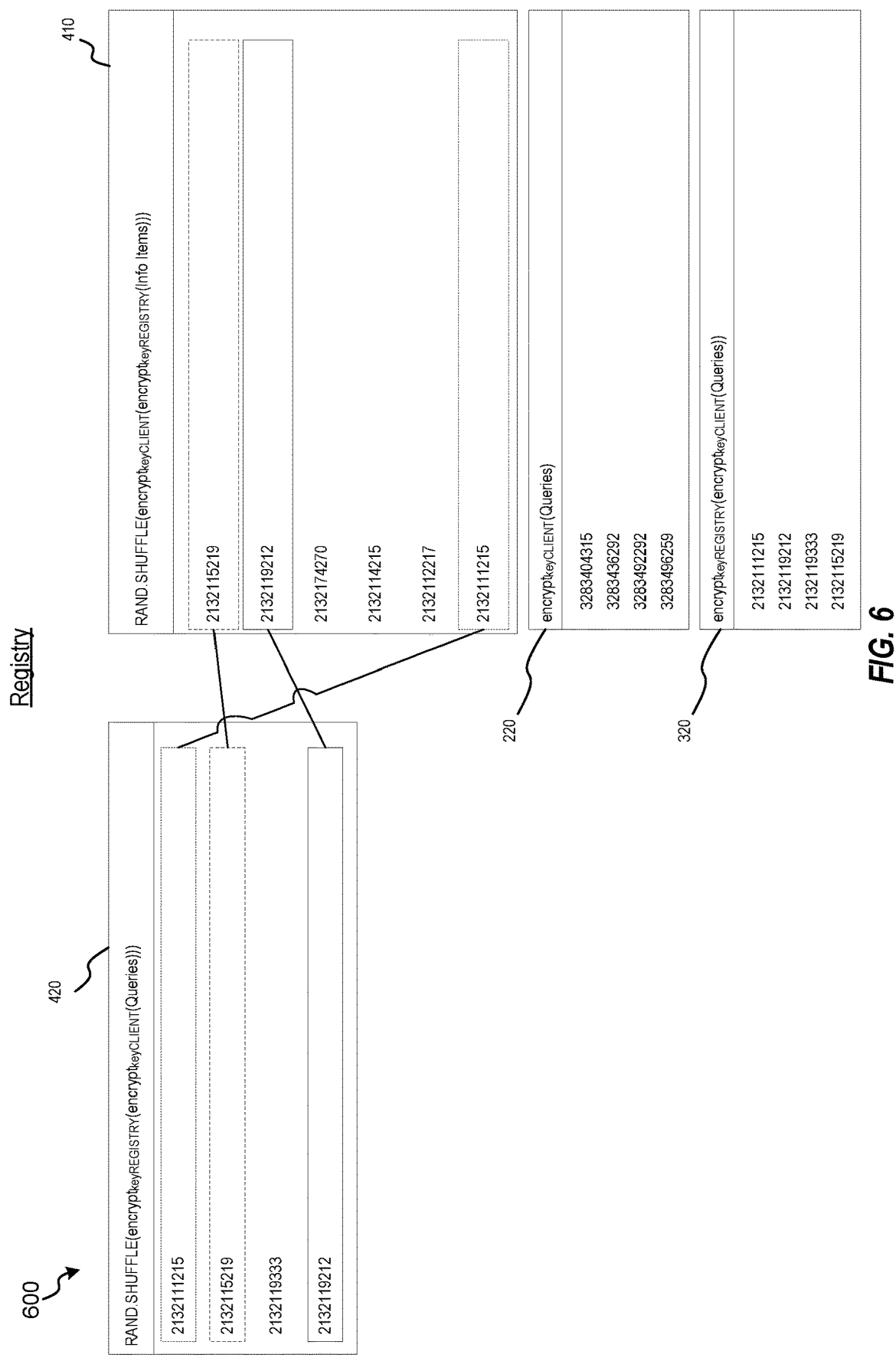

FIG. 6 illustrates operations 600 performed by the registry after the operations 500 of FIG. 5. As shown in FIG. 6, the registry may compare the randomly shuffled list 410 of domain information items to the randomly shuffled list 420 of domain information queries to identify if any matches exist, as described above with reference to FIG. 5. At this point, the registry is aware that the client has queried for three of the domain names maintained by (e.g., available to) the registry—but not which three domain names of the six domain names maintained by the registry.

Additionally, the registry may access a stored copy of the first encrypted list 220 of the domain information queries, and the registry may encrypt the first encrypted list 220 using the private key encryptkey$_{registry}$ to generate the second encrypted list 320 of the domain information queries (e.g., the double-encrypted list of the domain information queries). For example, the first encrypted list 220 may have been previously cached, and the registry may access the first encrypted list 220 from the cache to re-generate the second encrypted list 320. Alternatively, the second encrypted list 320 may have been cached, and the registry may access the second encrypted list 320 from the cache.

Figure 7:
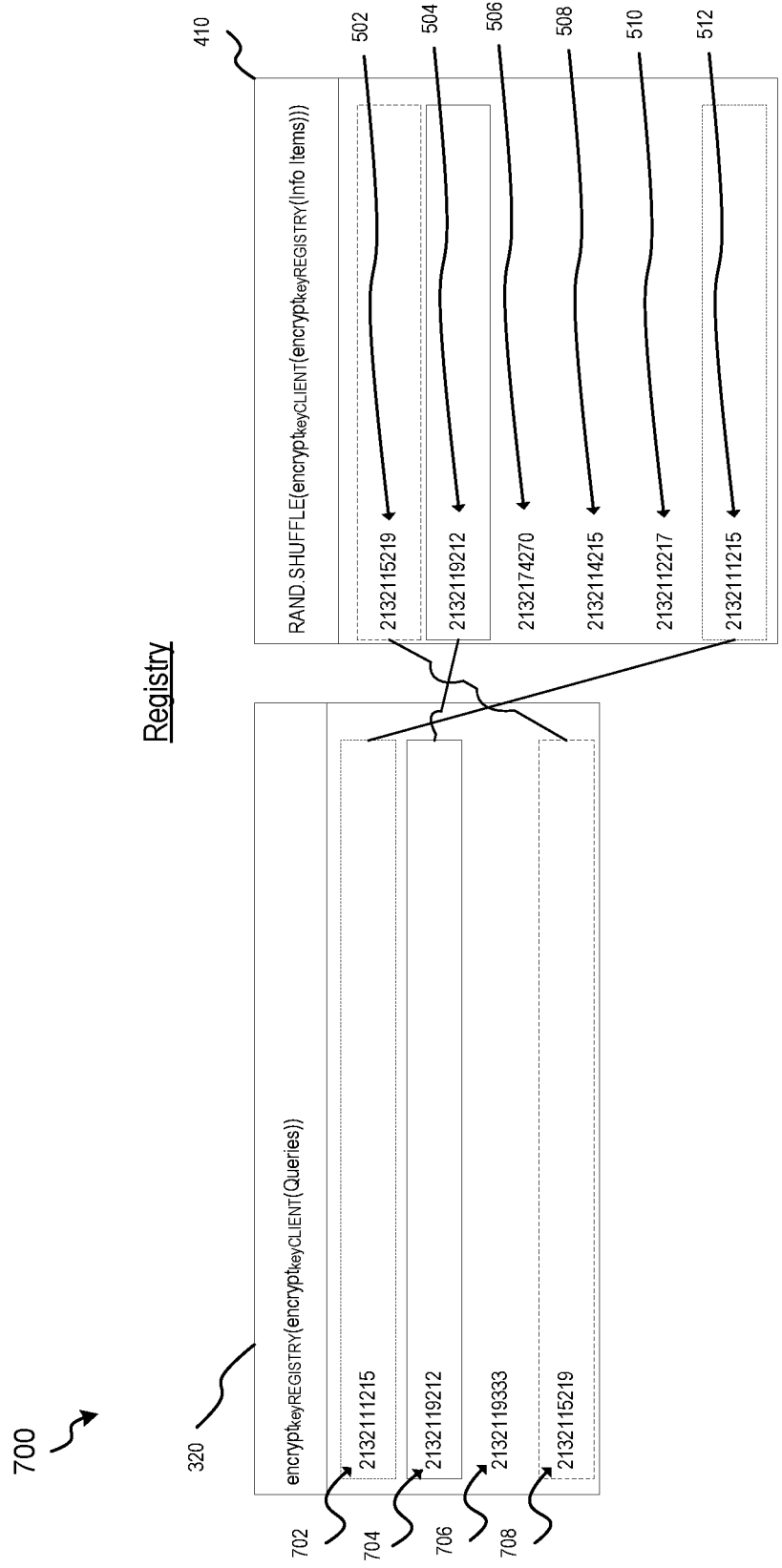

FIG. 7 illustrates operations 700 performed by the registry after the operations 600 of FIG. 6. As shown in FIG. 7, the registry may compare the second encrypted list 320 of domain information queries to the randomly shuffled list 410 of domain information items to determine which elements of the second encrypted list 320 match an element of the randomly shuffled list 410 (e.g., to determine the intersection of the second encrypted list 320 and the randomly shuffled list 410). As explained above, a domain information query and a domain information item that correspond to the same domain name will result in the same double-encrypted string, regardless of the order of encryption by the client and the registry using their respective private keys. In the example shown in FIG. 7, a first element 702 ("2132111215") of the second encrypted list 320 matches the sixth element 512 ("2132111215") of the randomly shuffled list 410, a second element 704 of the second encrypted list 320 ("2132119212") matches the second element 504 of the randomly shuffled list 410 ("2132119212"), and a fourth element 708 ("2132115219") of the second encrypted list 320 matches the first element 502 ("2132115219") of the randomly shuffled list 410. Additionally, a third element 706 ("2132119333") of the second encrypted list 320 does not match any element of the randomly shuffled list 410. The registry may identify the indices of any elements of the second encrypted list 320 that match an element of the randomly shuffled list 410, and the registry may transmit the indices to the client. For example, the registry may identify the indices one, two, and four based on the comparison of the two lists. The registry may transmit the indices to the client to enable the client to determine which domain information queries resulted in matches, and which domain information queries resulted in no matches. Because the registry is unable to fully decrypt the second encrypted list 320, the registry is unable to determine which domain names were queried by the client. Additionally, because the randomly shuffled list 410 is shuffled by the client, the registry is unable to determine which domain information items in the randomly shuffled list 410 (which correspond to domain information items in the list of domain information items 230) match queries from the client.

Figure 8:
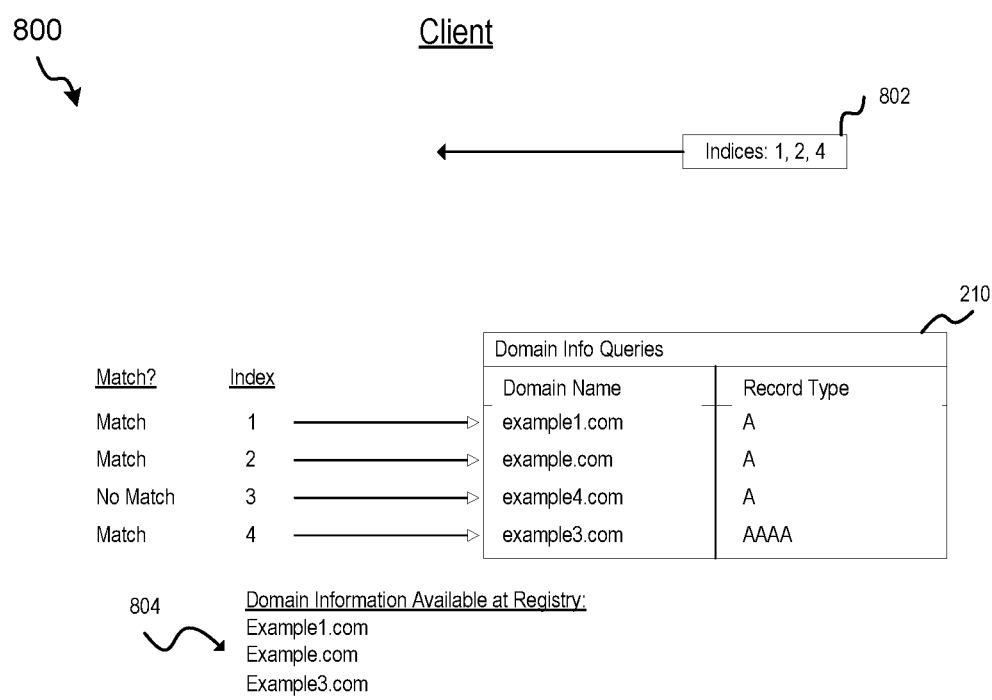

FIG. 8 illustrates operations 800 performed by the client after the operations 700 of FIG. 7. As shown in FIG. 8, the client may receive indices 802 from the registry. As described with reference to FIG. 7, the indices 802 are indices of elements of the ordered second encrypted list 320 of domain information queries that match elements of the randomly shuffled list 410 of domain information items that is generated by the client. Thus, the indices 802 may be used to identify which queries of the list of domain information queries 210 resulted in matches at the registry. To illustrate, the client may access the list of domain information queries 210 to determine which queries correspond to the indices 802. In the example shown in FIG. 8, the client may determine that domain names 804 (e.g., "example1.com", "example.com", and "example3.com") are included in the registry's list of domain name records (e.g., the list of domain information items 230), based on the domain names 804 corresponding to the indices 802 in the list of domain information queries 210. Additionally, the client may determine that "example4.com" does not match any domain name records maintained by the registry. Because the client receives the indices 802, the client is able to determine which queries correspond to matches, and which queries do not, without receiving an unsecure NXDOMAIN response or other DNS response. In some implementations, the client may initiate performance of one or more operations based on the domain names 804 or the domain names that are not associated with a match. For example, the client may request record values of one or more of the domain names 804 or may initiate purchase or lease of the domain name "example4.com" from the registry.

As described above with references to FIGS. 2-8, the process enables the client to query the registry for domain names (and optionally domain name record types and domain name record values) in a manner that maintains the privacy and confidentiality of the domain names being queried by the client and the list of domain names maintained by the registry. To illustrate, the information (e.g., the various lists of domain information queries or domain information items) exchanged between the client and the registry is single or double encrypted based on a private key associated with the originating device (and a private key associated with the other device in the case of double encryption). Although the indices 802 may not be encrypted, the indices 802 may not be useful to any party that cannot access the corresponding decrypted list. Thus, the process described with reference to FIGS. 2-8 may prevent the registry, or an intercepting device, from being able to identify the domain names being queried or from performing other attacks, such as spoofing, poising, or the like. Because the registry or other parties are not able to identify which domain names are being queried, or which queried domain names match domain names at the registry, the registry or another entity may be prevented from purchasing desired domain names before the client (e.g., cybersquatting) or from raising the prices associated with the desired domain names. Additionally, the registry is able to provide query results without exposing the list of domain information items 230 to the client, or other parties.

Figure 9:
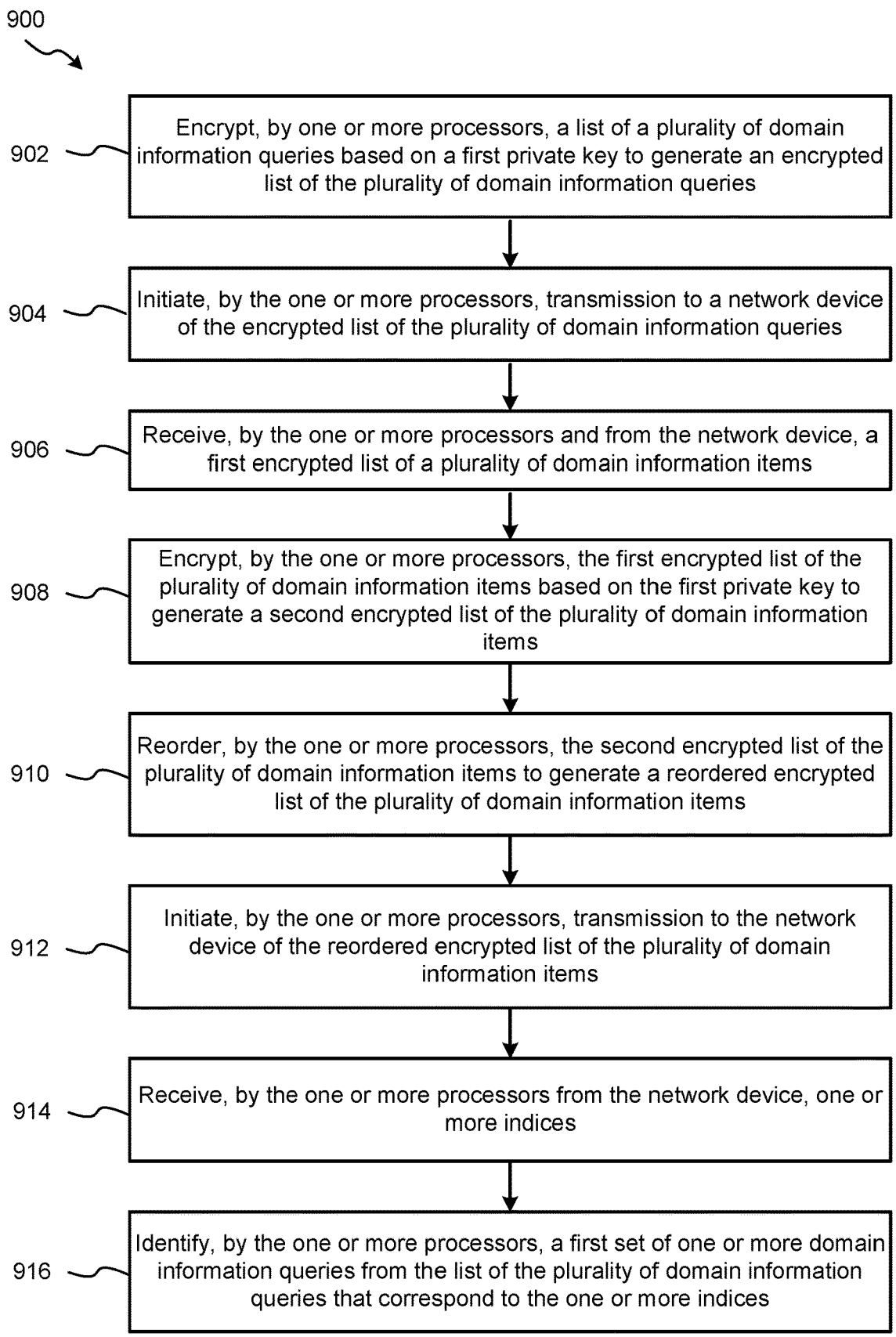
FIG. 9 is a flow diagram illustrating an example of a method for private querying for domain information between multiple devices according to one or more aspects.

Referring to FIG. 9, a flow diagram of an example of a method for private querying for domain information between multiple devices according to one or more aspects is shown as a method 900. In some implementations, the operations of the method 900 may be stored as instructions that, when executed by one or more processors (e.g., the one or more processors of a network device or a server), cause the one or more processors to perform the operations of the method 900. In some implementations, the method 900 may be performed by a network device, such as the network device 102 of FIG. 1 (e.g., a network device configured for private querying for domain information).

The method 900 includes encrypting a list of a plurality of domain information queries based on a first private key to generate an encrypted list of the plurality of domain information queries, at 902. For example, the list of the plurality of domain information queries may include or correspond to the list of domain information queries 112 of FIG. 1, the first private key may include or correspond to the first private key 110 of FIG. 1, and the encrypted list of the plurality of domain information queries may include or correspond to the first encrypted list 160 of FIG. 1. The method 900 includes initiating transmission to a network device of the encrypted list of the plurality of domain information queries, at 904. For example, the network device may include or correspond to the network device 130 of FIG. 1.

The method 900 includes receiving, from the network device, a first encrypted list of a plurality of domain information items, at 906. For example, the first encrypted list of the plurality of domain information items may include or correspond to the first encrypted list 162 of FIG. 1. The method 900 includes encrypting the first encrypted list of the plurality of domain information items based on the first private key to generate a second encrypted list of the plurality of domain information items, at 908. For example, the second encrypted list of the plurality of domain information items may include or correspond to the second encrypted list 114 of FIG. 1.

The method 900 includes reordering the second encrypted list of the plurality of domain information items to generate a reordered encrypted list of the plurality of domain information items, at 910. For example, the reordered encrypted list of the plurality of domain information items may include or correspond to the reordered encrypted list 164 of FIG. 1. The method 900 includes initiating transmission to the network device of the reordered encrypted list of the plurality of domain information items, at 912. For example, the network device 102 of FIG. 1 may transmit the reordered encrypted list 164 to the network device 130.

The method 900 includes receiving, from the network device, one or more indices, at 914. For example, the one or more indices may include or correspond to the indices 166 of FIG. 1. The method 900 includes identifying a first set of one or more domain information queries from the list of the plurality of domain information queries that correspond to the one or more indices, at 916. For example, the first set of one or more domain information queries may include or correspond to the first set of queries 116 of FIG. 1.

In some implementations, the method 900 may further include identifying a second set of one or more domain information queries from the list of the plurality of domain information queries that do not correspond to the one or more indices. For example, the second set of one or more domain information queries may include or correspond to the second set of queries 118 of FIG. 1. In some such implementations, the method 900 may also include initiating one or more operations with the network device. The one or more operations may correspond to the first set of one or more domain information queries, the second set of one or more domain information queries, or both. For example, the one or more operations may by indicated by the operation message 172 of FIG. 1. Additionally or alternatively, the method 900 may also include generating an output that indicates the first set of one or more domain information queries, the second set of one or more information queries, or both. For example, the network device 102 of FIG. 1 may generate an output, such as for display on a display device integrated within or coupled to the network device 102, that indicates the first set of queries 116, the second set of queries 118, or both.

In some implementations, the method 900 may further include receiving, from the network device, a reordered encrypted list of the plurality of domain information queries prior to receiving the one or more indices, comparing the reordered encrypted list of the plurality of domain information queries to the reordered encrypted list of the plurality of domain information items, and initiating transmission of an index request to the network device based on a determination that at least one element of the reordered encrypted list of the plurality of domain information items matches at least one element of the reordered encrypted list of the plurality of domain information queries. For example, the reordered encrypted list of the plurality of domain information queries may include or correspond to the reordered encrypted list 144 of FIG. 1, and the comparison engine 126 may compare the reordered encrypted list 144 to the reordered encrypted list 164 to determine whether to transmit the index request 168.

In some implementations, the plurality of domain information queries may include queries for domain names, queries for domain name record types, queries for domain name record values, or a combination thereof, as further described above with reference to FIG. 2. Additionally or alternatively, the first encrypted list of the plurality of domain information items may be encrypted based on a second private key that is distinct from the first private key. For example, the second private key may include or correspond to the second private key 138 of FIG. 1. In some such implementations, the second private key may be inaccessible to the one or more processors. For example, the second private key 138 of FIG. 1 is inaccessible to the network device 102.

In some implementations, reordering the second encrypted list of the plurality of domain information items may include randomly reordering the second encrypted list of the plurality of domain information items. For example, the ordering engine 124 of FIG. 1 may randomly shuffle the second encrypted list 114 to generate the reordered encrypted list 164. Additionally or alternatively, the method 900 may include receiving user input indicating the plurality of domain information queries and generating the list of the plurality of domain information queries. For example, the network device 102 of FIG. 1 may generate the list of domain information queries 112 based on a user input that indicates the domain information queries.

Figure 10:
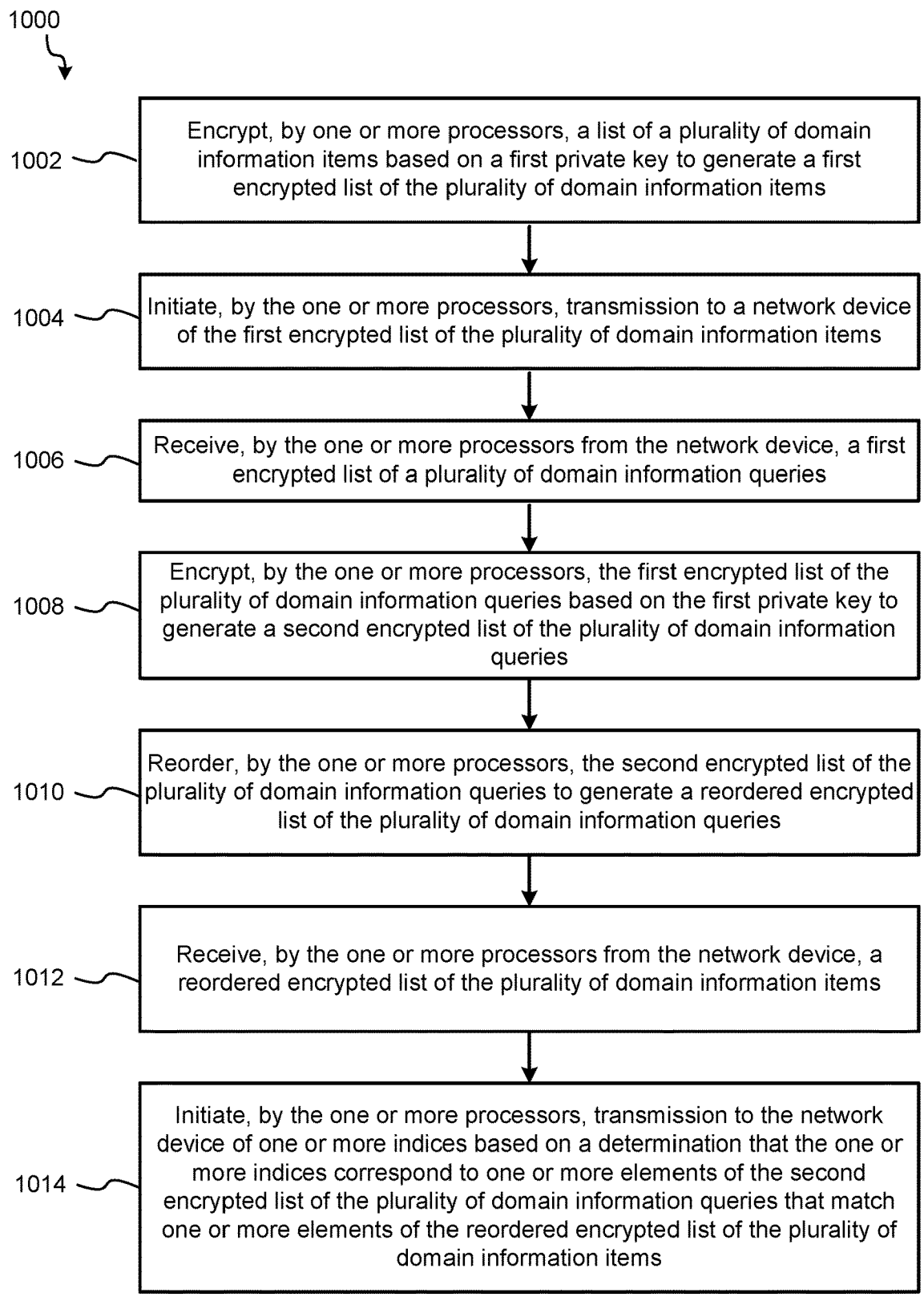
FIG. 10 is a flow diagram illustrating an example of a method for private exchanging of domain information between multiple devices according to one or more aspects.

Referring to FIG. 10, a flow diagram of an example of a method for private exchanging of domain information between multiple devices according to one or more aspects is shown as a method 1000. In some implementations, the operations of the method 1000 may be stored as instructions that, when executed by one or more processors (e.g., the one or more processors of a network device or a server), cause the one or more processors to perform the operations of the method 1000. In some implementations, the method 1000 may be performed by a network device (e.g., a network device configured for maintaining a registry of domain information, a ROOT device, a CZDS, or the like), such as the network device 130 of FIG. 1.

The method 1000 includes encrypting a list of a plurality of domain information items based on a first private key to generate a first encrypted list of the plurality of domain information items, at 1002. For example, the list of the plurality of domain information items may include or correspond to the list of domain information items 140 of FIG. 1, the first private key may include or correspond to the second private key 138 of FIG. 1, and the first encrypted list of the plurality of domain information items may include or correspond to the first encrypted list 162 of FIG. 1. The method 1000 includes initiating transmission to a network device of the first encrypted list of the plurality of domain information items, at 1004. For example, the network device may include or correspond to the network device 102 of FIG. 1.

The method 1000 includes receiving, from the network device, a first encrypted list of a plurality of domain information queries, at 1006. For example, the first encrypted list of the plurality of domain information queries may include or correspond to the first encrypted list 160 of FIG. 1. The method 1000 includes encrypting the first encrypted list of the plurality of domain information queries based on the first private key to generate a second encrypted list of the plurality of domain information queries, at 1008. For example, the second encrypted list of the plurality of domain information queries may include or correspond to the second encrypted list 142 of FIG. 1.

The method 1000 includes reordering the second encrypted list of the plurality of domain information queries to generate a reordered encrypted list of the plurality of domain information queries, at 1010. For example, the reordered encrypted list of the plurality of domain information queries may include or correspond to the reordered encrypted list 144 of FIG. 1. The method 1000 includes receiving, from the network device, a reordered encrypted list of the plurality of domain information items, at 1012. For example, the reordered encrypted list of the plurality of domain information items may include or correspond to the reordered encrypted list 164 of FIG. 1.

The method 1000 includes initiating transmission to the network device of one or more indices based on a determination that the one or more indices correspond to one or more elements of the second encrypted list of the plurality of domain information queries that match one or more elements of the reordered encrypted list of the plurality of domain information items, at 1014. For example, the one or more indices may include or correspond to the indices 166 of FIG. 1.

In some implementations, the method 1000 may further include initiating transmission to the network device of an indication of no match based on a determination that no element of the second encrypted list of the plurality of domain information queries match any element of the reordered encrypted list of the plurality of domain information items. For example, the network device 130 of FIG. 1 may initiate the transmission of match indicator 170, which may indicate no match, based on a determination that no element of the second encrypted list 142 matches any element of the reordered encrypted list 164.

In some implementations, the method 1000 may further include receiving, from the network device, an index request. The transmission of the one or more indices may be initiated based further on receipt of the index request. For example, the index request may include or correspond to the index request 168 of FIG. 1. Additionally or alternatively, the method 1000 may further include initiating transmission to the network device of the reordered encrypted list of the plurality of domain information queries prior to transmission of the one or more indices. For example, the network device 130 of FIG. 1 may transmit the reordered encrypted list 144 to the network device 102 prior to transmitting the indices 166 to the network device 102.

In some implementations, the plurality of domain information items may include domain names, domain record types, domain name record values, or a combination thereof, as further described above with reference to FIG. 2. Additionally or alternatively, the first encrypted list of the plurality of domain information queries may be encrypted based on a second private key that is distinct from the first private key. For example, the second private key may include or correspond to the first private key 110 of FIG. 1. In some such implementations, the second private key may be inaccessible to the one or more processors. For example, the first private key 110 of FIG. 1 may be inaccessible to the network device 130.

In some implementations, reordering the second encrypted list of the plurality of domain information queries includes randomly reordering the second encrypted list of the plurality of domain information queries. For example, the ordering engine 154 of FIG. 1 may randomly shuffle the second encrypted list 142 to generate the reordered encrypted list 144. Additionally or alternatively, the method 1000 may further include receiving, from the network device, a message requesting performance of one or more operations corresponding to one or more domain information queries. For example, the message requesting performance of one or more operations may include or correspond to the operation message 172 of FIG. 1.

It is noted that other types of devices and functionality may be provided according to aspects of the present disclosure and discussion of specific devices and functionality herein have been provided for purposes of illustration, rather than by way of limitation. It is noted that the operations of the method 900 of FIG. 9 and the method 1000 of FIG. 10 may be performed in any order, or that operations of one method may be performed during performance of another method, such as the method 1000 of FIG. 10 including one or more operations of the method 900 of FIG. 9. It is also noted that the method 900 of FIG. 9 and the method 1000 of FIG. 10 may also include other functionality or operations consistent with the description of the operations of the system 100 of FIG. 1 or the process of FIGS. 2-8.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for private querying for domain information between multiple devices, the method comprising:
    encrypting, by one or more processors, a list of a plurality of domain information queries based on a first private key to generate an encrypted list of the plurality of domain information queries;
    initiating, by the one or more processors, transmission to a network device of the encrypted list of the plurality of domain information queries;
    receiving, by the one or more processors and from the network device, a first encrypted list of a plurality of domain information items;
    encrypting, by the one or more processors, the first encrypted list of the plurality of domain information items based on the first private key to generate a second encrypted list of the plurality of domain information items;
    reordering, by the one or more processors, the second encrypted list of the plurality of domain information items to generate a reordered encrypted list of the plurality of domain information items;
    initiating, by the one or more processors, transmission to the network device of the reordered encrypted list of the plurality of domain information items;
    receiving, by the one or more processors from the network device, one or more indices; and
    identifying, by the one or more processors, a first set of one or more domain information queries from the list of the plurality of domain information queries that correspond to the one or more indices.

2. The method of claim 1, further comprising identifying, by the one or more processors, a second set of one or more domain information queries from the list of the plurality of domain information queries that do not correspond to the one or more indices.

3. The method of claim 2, further comprising initiating, by the one or more processors, one or more operations with the network device,
    wherein the one or more operations correspond to the first set of one or more domain information queries, the second set of one or more domain information queries, or both.

4. The method of claim 2, further comprising generating, by the one or more processors, an output that indicates the first set of one or more domain information queries, the second set of one or more domain information queries, or both.

5. The method of claim 1, further comprising, prior to receiving the one or more indices:
    receiving, by the one or more processors from the network device, a reordered encrypted list of the plurality of domain information queries;
    comparing, by the one or more processors, the reordered encrypted list of the plurality of domain information queries to the reordered encrypted list of the plurality of domain information items; and
    initiating, by the one or more processors, transmission of an index request to the network device based on a determination that at least one element of the reordered encrypted list of the plurality of domain information items matches at least one element of the reordered encrypted list of the plurality of domain information queries.

6. The method of claim 1, wherein reordering the second encrypted list of the plurality of domain information items comprises randomly reordering the second encrypted list of the plurality of domain information items.

7. The method of claim 1, further comprising:
    receiving, by the one or more processors, user input indicating the plurality of domain information queries; and
    generating, by the one or more processors, the list of the plurality of domain information queries.

8. A device for private querying for domain information between multiple devices, the device comprising:
    a memory; and
    one or more processors communicatively coupled to the memory, the one or more processors configured to:
        encrypt a list of a plurality of domain information queries based on a first private key to generate an encrypted list of the plurality of domain information queries;
        initiate transmission to a network device of the encrypted list of the plurality of domain information queries;
        receive, from the network device, a first encrypted list of a plurality of domain information items;
        encrypt the first encrypted list of the plurality of domain information items based on the first private key to generate a second encrypted list of the plurality of domain information items;
        reorder the second encrypted list of the plurality of domain information items to generate a reordered encrypted list of the plurality of domain information items;
        initiate transmission to the network device of the reordered encrypted list of the plurality of domain information items;
        receive, from the network device, one or more indices; and
        identify a first set of one or more domain information queries from the list of the plurality of domain information queries that correspond to the one or more indices.

9. The device of claim 8, wherein the plurality of domain information queries comprise queries for domain names, queries for domain name record types, queries for domain name record values, or a combination thereof.

10. The device of claim 8, wherein the first encrypted list of the plurality of domain information items is encrypted based on a second private key that is distinct from the first private key.

11. The device of claim 10, wherein the second private key is inaccessible to the one or more processors.

12. A method for private exchanging of domain information between multiple devices, the method comprising:
    encrypting, by one or more processors, a list of a plurality of domain information items based on a first private key to generate a first encrypted list of the plurality of domain information items;
    initiating, by the one or more processors, transmission to a network device of the first encrypted list of the plurality of domain information items;
    receiving, by the one or more processors from the network device, a first encrypted list of a plurality of domain information queries;
    encrypting, by the one or more processors, the first encrypted list of the plurality of domain information queries based on the first private key to generate a second encrypted list of the plurality of domain information queries;

reordering, by the one or more processors, the second encrypted list of the plurality of domain information queries to generate a reordered encrypted list of the plurality of domain information queries;

receiving, by the one or more processors from the network device, a reordered encrypted list of the plurality of domain information items; and initiating, by the one or more processors, transmission to the network device of one or more indices based on a determination that the one or more indices correspond to one or more elements of the second encrypted list of the plurality of domain information queries that match one or more elements of the reordered encrypted list of the plurality of domain information items.

13. The method of claim 12, further comprising initiating, by the one or more processors, transmission to the network device of an indication of no match based on a determination that no element of the second encrypted list of the plurality of domain information queries match any element of the reordered encrypted list of the plurality of domain information items.

14. The method of claim 12, further comprising receiving, by the one or more processors and from the network device, an index request, wherein transmission of the one or more indices is initiated based further on receipt of the index request.

15. The method of claim 12, further comprising, prior to transmission of the one or more indices, initiating, by the one or more processors, transmission to the network device of the reordered encrypted list of the plurality of domain information queries.

16. The method of claim 12, wherein the plurality of domain information items comprise domain names, domain name record types, domain name record values, or a combination thereof.

17. The method of claim 12, wherein the first encrypted list of the plurality of domain information queries is encrypted based on a second private key that is distinct from the first private key.

18. The method of claim 17, wherein the second private key is inaccessible to the one or more processors.

19. The method of claim 12, wherein reordering the second encrypted list of the plurality of domain information queries comprises randomly reordering the second encrypted list of the plurality of domain information queries.

20. The method of claim 12, further comprising receiving, by the one or more processors from the network device, a message requesting performance of one or more operations corresponding to one or more domain information queries.

* * * * *